(12) United States Patent
Tsuruta et al.

(10) Patent No.: US 7,303,479 B2
(45) Date of Patent: Dec. 4, 2007

(54) FRICTIONAL RESISTANCE GENERATION MECHANISM

(75) Inventors: Hiroyoshi Tsuruta, Kadoma (JP); Hiroshi Uehara, Hirakata (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 11/528,340

(22) Filed: Sep. 28, 2006

(65) Prior Publication Data

US 2007/0021221 A1  Jan. 25, 2007

Related U.S. Application Data

(62) Division of application No. 10/853,784, filed on May 26, 2004, now Pat. No. 7,134,963.

(30) Foreign Application Priority Data

| Jun. 6, 2003 | (JP) | ............................. 2003-162895 |
| Aug. 11, 2003 | (JP) | ............................. 2003-291030 |
| Dec. 26, 2003 | (JP) | ............................. 2003-434460 |
| Jan. 26, 2004 | (JP) | ............................. 2004-017470 |

(51) Int. Cl.
*F16F 15/129* (2006.01)

(52) U.S. Cl. ..................................... 464/68.4; 464/160

(58) Field of Classification Search ........... 192/213.11, 192/213.12, 213.21, 213.22, 213.3, 214.1; 464/68.4, 68.41, 83, 160
See application file for complete search history.

(56) References Cited

U.S. PATENT DOCUMENTS

| 1,953,996 | A | * | 4/1934 | Taylor |
| 5,676,226 | A | * | 10/1997 | Lampela et al. |
| 5,893,446 | A | * | 4/1999 | Honjo et al. ......... 192/213.22 X |
| 2001/0046898 | A1 | * | 11/2001 | Rohs et al. .................... 464/68 |

FOREIGN PATENT DOCUMENTS

DE  196 32 086 A1 * 2/1997

* cited by examiner

*Primary Examiner*—Greg Binda
(74) *Attorney, Agent, or Firm*—Global IP Counselors, LLP

(57) ABSTRACT

A friction resistance generation mechanism is disposed between two relatively rotatable members of a rotating mechanism. The mechanism includes an input side disk-like plate 32, output side disk-like plates 30 and 31, friction shims 361A, 361B, and 361C aligned and disposed in a direction of rotation. A plurality of elastic members is disposed among the friction shims in the direction of rotation.

22 Claims, 26 Drawing Sheets

FRICTIONAL RESISTANCE GENERATION MECHANISM

CROSS-REFERENCE TO RELATED APPLICATIONS

This application is a divisional application of U.S. patent application No. Ser. 10/853,784 filed on May 26, 2004, allowed on Aug. 1, 2006, now U.S. Pat. No. 7,134,963. The entire disclosure of U.S. patent application Ser. No. 10/853, 784 is hereby incorporated herein by reference.

This application claims priority to Japanese Patent Application Nos. 2003-162895, 2003-291030, 2003-434460, and 2004-017470. The entire disclosures of Japanese Patent Application Nos. 2003-162895, 2003-291030, 2003-434460, and 2004-017470 are hereby incorporated herein by reference.

BACKGROUND OF THE INVENTION

1. Field of the Invention

The present invention relates to a frictional resistance generation mechanism. More specifically, the present invention relates to a mechanism for attenuating torsional vibration that is disposed between two relatively rotatable members of a rotating mechanism, and is designed to generate frictional resistance and to attenuate the torsional vibration due to the torsional friction when the two members rotate relative to each other.

2. Background Information

A clutch disk assembly used in vehicles has a clutch function for engaging or disengaging a flywheel, and a damper function for absorbing and attenuating torsional vibration from the flywheel. A vehicle commonly emits abnormal, i.e. deviating from a standard, noises during idling (rattling noise), abnormal noises while running (acceleration/deceleration rattling, booming noise), and tip-in/tip-out noise (low frequency vibration). It is a function of the damper of the clutch disk assembly to eliminate these abnormal noises and vibrations.

An abnormal noise while idling is a noise that can be heard as a "rattle" generated by the transmission when shifted into the neutral gear and the clutch pedal is released while waiting at a traffic light or the like. The reason for this abnormal noise is that the engine torque is low in the vicinity of engine idling rotation, and torque fluctuation is considerable during engine firing. Rattling noise occurs between the counter gear and input gear of the transmission at this time.

The tip-in/tip-out (low frequency vibration) refers to the considerable longitudinal lurch of the car body that is generated when the accelerator pedal is suddenly depressed or released. When the rigidity of the drive transmission system is low, the torque transmitted to the tires is conversely transmitted to the drive transmission system from the tires, and excessive torque is generated in the tires as a backlash. The result is a longitudinal vibration that violently and transiently shakes the car body in the longitudinal direction.

The torsion characteristics of a conventional clutch disk assembly are insufficient in the vicinity of the zero torque to counter the abnormal noise during idling because the torsional rigidity at this point should be low. On the other hand, the torsion characteristics of the clutch disk assembly body must be as solid or rigid as possible to counter the longitudinal vibrations of tip-in/tip-out.

To solve the above-described problems, a clutch disk assembly in which a two-stage characteristic is realized by using two types of spring members is provided. In view of the above, this has an effect of preventing abnormal noise during idling because the torsional rigidity and the hysteresis torque are kept low in the first stage (low torsional angle area) in the torsion characteristics. The longitudinal vibration of tip-in/tip-out can be sufficiently attenuated because the torsional rigidity and the hysteresis torque are set high in the second stage (high torsional angle area) in the torsion characteristics. Also known is a damper mechanism for efficiently absorbing minute torsional vibrations by not allowing the large friction mechanism in the second stage to operate when minute torsional vibrations, which are caused, for example, by combustion fluctuations in the engine in the second stage of torsion characteristics, are inputted.

The entire frictional resistance generation mechanism in the above-described damper mechanism is arranged to act parallel to the direction of rotation with a highly rigid spring member, and further has a frictional resistance generating unit and a rotational direction coupling that is disposed so as to act parallel to the direction of rotation in relation thereto. The rotational direction coupling has a narrow rotational direction gap between two members. Therefore, there is no collision in the rotational direction coupling when minute torsional vibrations caused by combustion fluctuations in the engine are inputted. Further, at this time, the frictional resistance generating unit does not operate.

On the other hand, the frictional unit operates in response to torsional vibrations with a large torsional angle. The frictional resistance generating unit does not operate in the narrow rotational direction gap at both ends of the torsional angle. That is to say, when a torsional vibration with a large torsional angle is input, a sudden shift occurs from the area where the frictional resistance generating unit does not operate to the area of large frictional resistance in which the frictional resistance generating unit does operate at both ends of the torsional angle. In other words, the impact is considerable when the members including the gap in the rotational direction collide with each other because large frictional resistance builds up in the vertical direction. As a result, a so-called knocking sound is generated.

In view of the above, it will be apparent to those skilled in the art from this disclosure that there exists a need for an improved frictional resistance generation mechanism. This invention addresses this need in the art as well as other needs, which will become apparent to those skilled in the art from this disclosure.

SUMMARY OF THE INVENTION

An object of the present invention is to suppress the generation of knocking sounds in the frictional resistance generation mechanism disposed in the narrow rotational direction gap in order to absorb minute torsional vibrations.

A frictional resistance generation mechanism according to a first aspect of the present invention is a mechanism that attenuates torsional vibrations and is disposed between two relatively rotatable members of a rotating mechanism. The mechanism is designed to generate frictional resistance in order to attenuate the torsional vibration due to the torsional friction when the two members rotate relative to each other. The mechanism includes a first rotating member, a second rotating member, first frictional members, and second frictional members. The second rotating member is disposed in a rotatable manner in relation to the first rotating member. The first frictional members are frictionally engaged with the second rotating member in a movable manner in the direction of rotation, and engaged in a manner that allows torque to be transmitted to the first rotating member by way of a first rotational direction gap. The second frictional members are frictionally engaged in a movable manner in the direction of rotation with respect to the second rotating member, and engaged in a manner that allows torque to be transmitted to the first rotating member by way of a second rotational direction gap with a different size than the first rotational direction gap.

In this frictional resistance generating mechanism, when the first rotating member rotates relative to the second rotating member, the rotational direction gap between the frictional members and the first rotating member initially becomes narrower. Frictional resistance with the frictional members is not generated at this time. Next, the first rotating member is engaged with one of either the first frictional members or the second frictional members, and the frictional members are caused to slide on the second rotating member. The first rotating member subsequently is engaged with the other of the first frictional members and second frictional members, and the frictional members are caused to slide on the second rotating member. When the second frictional members have slid on the second rotating member, the first frictional members have also slid on the second rotating member, so considerable frictional resistance is generated overall.

As described above, only one of the frictional members slides on the second rotating member, and intermediate frictional resistance is generated before a large frictional resistance is generated overall. A barrier of high hysteresis torque is not present when a large frictional resistance is generated because the buildup of large frictional resistance is graduated in this manner. As a result, the knocking sound of the pawl decreases when a high hysteresis torque is generated in the frictional resistance generating mechanism.

A frictional resistance generation mechanism according to a second aspect of the present invention is the mechanism of the first aspect wherein, the first frictional members and the second frictional members are disposed parallel to the direction of rotation in the same radial position by way of a rotational direction gap that is equal to or greater than the difference between the first rotational direction gap and the second rotational direction gap.

In this frictional resistance generating mechanism, the entire radial size does not easily increase because the first frictional members and the second frictional members are disposed in the same radial position. In other words, the size of the mechanism can be controlled or minimized because of the radial positions of the frictional members.

A frictional resistance generation mechanism according a third aspect of the present invention is the mechanism of the first aspect wherein, the engagement portion between the first frictional members and the second frictional members, as well as the engagement portion between the second frictional members and the first frictional members, has combinations of concavities and convexities, respectively.

A frictional resistance generation mechanism according to a fourth aspect of the present invention is the mechanism of the third aspect wherein, the first frictional members and the second frictional members have first and second coupling concavities. The first rotating member has first and second coupling convexities respectively engaged with the first and second coupling concavities in a manner that allows torque to be transmitted by way of the first and second rotational direction gaps.

A frictional resistance generation mechanism according to a fifth aspect of the present invention is the mechanism of any one of the first to fourth aspects wherein, the first frictional members and the second frictional members are composed of the same material. As a result, the frictional members are inexpensive.

A frictional resistance generation mechanism according to a sixth aspect of the present invention is the mechanism of any one of the first to fifth aspects wherein, the first frictional members and the second frictional members have the same shape. As a result, the frictional members are inexpensive to produce relative to those with different shapes.

A frictional resistance generation mechanism according to a seventh aspect of the present invention is the mechanism of the fourth aspect wherein, the first and second coupling convexities are brought into contact with the second rotating member in a slidable manner in the direction of rotation. As a result, the first and second coupling convexities constantly slide on the second rotating member when the first rotating member and the second rotating member rotate relative to each other, that is to say, frictional resistance is also generated until contact is made with the first and second frictional members. In this manner, the first and second coupling convexities are endowed with a function for generating friction, and a function for coupling to the first and second frictional members. In other words, the number of components is reduced and the structure is simplified because the first and second coupling convexities have a plurality of functions.

A frictional resistance generation mechanism according to an eighth aspect of the present invention is the mechanism of the seventh aspect wherein, the first and second coupling convexities are disposed to rotate integrally with other portions of the first rotating member and in a manner that allows movement in the axial direction. The frictional resistance generation mechanism further includes an urging member to urge the first and second coupling convexities against the second rotating member. As a result, the first and second coupling convexities slide on the second rotating member, being urged to the second frictional members by the urging member.

A frictional resistance generation mechanism according to a ninth aspect of the present invention is the mechanism of the eighth aspect wherein, the urging member urges the first and second frictional members against the second rotating member. The urging member urges not only the first and second frictional members, but also the first and second coupling convexities to the second rotating member. In other words, the urging member possesses a plurality of functions, and the number of components is therefore reduced and the structure simplified.

A frictional resistance generation mechanism according to a tenth aspect of the present invention is a mechanism that is disposed between two relatively rotatable members of a rotating mechanism, and is designed to generate frictional resistance in order to attenuate torsional vibrations due to torsional friction when the two members rotate relative to each other. The mechanism has a first rotating member, a second rotating member, a high-friction generation member, and a low-friction generation member. The second rotating member is disposed in a rotatable manner in relation to the first rotating member. The high-friction generation member is frictionally engaged with the second rotating member in a movable manner in the direction of rotation. The low-friction generation member integrally rotates with the first rotating member, is engaged with the high-friction generation member by way of a rotation direction gap, and is frictionally engaged with the second rotating member in a movable manner in the direction of rotation.

In this friction resistance generation mechanism, the rotational direction gap between the low-friction generation member and the high-friction generation member initially grows smaller when the first rotating member rotates in relation to the second rotating member. Frictional resistance is not generated by the frictional members at this time. However, the low-friction generation member slides in relation to the second rotating member, and a small amount of friction is generated. Next, the low-friction generation member is engaged with the high-friction generation member, and the high-friction generation member slides on the second rotating member. As a result, the high-friction generating member generates large friction. Thus, the low-friction generation member possesses a function for generating small friction and a function for coupling with the high-friction generation member. In other words, the low-friction generation member possesses a plurality of functions, and the number of components is therefore reduced and the structure simplified.

A frictional resistance generation mechanism according to an eleventh aspect of the present invention is the mechanism of the tenth aspect wherein, the high-friction generation member and the low-friction generation member make contact in the axial direction with the second rotating member. The frictional resistance generation mechanism further has an urging member to urge the high-friction generation member and the low-friction generation member to the second rotating member. Thus, the urging member urges not only the high-friction generation member, but also the low-friction generation member to the second rotating member. In other words, the urging member possesses a plurality of functions, and the number of components is therefore reduced and the structure simplified.

A frictional resistance generation mechanism according to a twelfth aspect of the present invention is the mechanism of the eleventh aspect wherein, the low-friction generation member is engaged with the first rotating member in a manner that allows movement in the axial direction. As a result, the low-friction generation member is urged by the urging member, and contact is made with the second rotating member in the axial direction.

A frictional resistance generation mechanism according to a thirteenth aspect of the present invention is the mechanism of any one of the tenth to twelfth aspects wherein, both the low-friction generation member and the high-friction generation member are composed of resin. As a result, impact is reduced when the low-friction generation member and the high-friction generation member collide with each other.

A frictional resistance generation mechanism according to a fourteenth aspect of the present invention is the mechanism of any one of the first to ninth aspects that further has a cushioning member disposed in a portion in which at least one of the low-friction generation member and the high-friction generation member collides with the first rotating member in the direction of rotation. As a result, knocking sounds are reduced when the frictional members collide with the first rotating member.

A frictional resistance generation mechanism according to a fifteenth aspect of the present invention is the mechanism of the third aspect that further includes a cushioning member disposed in a portion in which at least one of the low-friction generation member and the high-friction generation member collides with the first rotating member. The cushioning member is disposed on the rotational direction surface of at least one of the concavities and convexities. As a result, knocking sounds are reduced when the frictional members collide with the first rotating member.

The frictional resistance generation mechanism according to a sixteenth aspect of the present invention is the mechanism of the fourth aspect that further includes a cushioning member disposed in a portion in which at least one of the low-friction generation member and the high-friction generation member collides with the first rotating member. The cushioning member is disposed on the rotational direction surface of at least one of the first coupling concavities and second coupling concavities. As a result, knocking sounds are reduced when the frictional members collide with the first rotating member.

A frictional resistance generation mechanism according to a seventeenth aspect of the present invention is the mechanism of any one of the first to ninth or fourteenth to sixteenth aspects wherein, the magnitudes of the friction resistance generated by the first frictional members and the friction resistance generated by the second frictional members are different.

A frictional resistance generation mechanism according to an eighteenth aspect of the present invention is the mechanism of the eleventh aspect wherein, the friction resistance generated by the second frictional members is greater than the friction resistance generated by the first frictional members.

A frictional resistance generation mechanism according to a nineteenth aspect of the present invention is the mechanism of any one of the first to ninth or fourteenth to sixteenth aspects wherein, the numbers of the first frictional members and second frictional members are different.

A frictional resistance generation mechanism according to a twentieth aspect of the present invention is the mechanism of the nineteenth aspect wherein, the second rotational direction gap has a greater length than the first rotational direction gap, and the number of the second frictional members is greater than the number of the first frictional members. As a result, only the first frictional members initially generate frictional resistance, and then the first frictional members and the second frictional members generate frictional resistance. Here, the magnitude of the subsequently generated frictional resistance can be made sufficiently large.

A frictional resistance generation mechanism according to a twenty-first aspect of the present invention is the mechanism of any one of the first to ninth or fourteenth to eighteenth aspects wherein, the surface areas of the first frictional members and second frictional members are different. As a result, the magnitudes of the frictional resistance obtained by the first frictional members and the second frictional members are different.

A frictional resistance generation mechanism according to a twenty-second aspect of the present invention is the mechanism of the twenty-first aspect wherein, the second rotational direction gap has a greater length than the first rotational direction gap, and the surface area of the second frictional members is greater than the surface area of the first frictional members. As a result, only the first frictional members initially generate frictional resistance, and then the first frictional members and the second frictional members generate frictional resistance. Here, the magnitude of the subsequently generated frictional resistance can be made sufficiently large.

A frictional resistance generation mechanism according to a twenty-third aspect of the present invention is the mechanism of the twenty-second aspect wherein, the second frictional members have a greater length than the first frictional members in the direction of rotation.

A frictional resistance generation mechanism according to a twenty-fourth aspect of the present invention is the mechanism of any one of the second to twenty-third aspects wherein, an elastic member disposed between the first frictional members and the second frictional members in the direction of rotation is further provided.

In this frictional resistance generation mechanism, the elastic members on the movement side in the direction of rotation of the first frictional members are compressed and the elastic members on the opposing side of the movement side in the direction of rotation of the first frictional members stretch themselves during the interval of time beginning when the first frictional members are driven until the second frictional members are driven. Therefore, the hysteresis torque gradually increases, and, as a result, the buildup of hysteresis torque decreases the instant that the second frictional members operate. The result of the above is that the knocking sound during high hysteresis torque is reduced.

A frictional resistance generation mechanism according to a twenty-fifth aspect of the present invention is the mechanism of the twenty-fourth aspect wherein, the elastic member is disposed between the first frictional members and the second frictional members in a compressed state in the direction of rotation.

A frictional resistance generation mechanism in accordance with a twenty-sixth aspect of the present invention attenuates torsional vibration, is disposed between two relatively rotatable members of a rotating mechanism, and is designed to generate frictional resistance in order to attenuate torsional vibrations due to the torsional friction when the two members rotate relative to each other, wherein this mechanism has a first rotating member, a second rotating member, a plurality of frictional members, and a plurality of elastic members. The second rotating member is disposed in a rotatable manner in relation to the first rotating member. The plurality of frictional members is aligned and disposed in the direction of rotation, frictionally engaged with the second rotating member in a movable manner in the direction of rotation, and engaged in a manner that allows torque to be transmitted to the first rotating member by way of rotational direction gaps with different sizes. The plurality of elastic members is disposed among the plurality of frictional members in the direction of rotation.

In this frictional resistance generation mechanism, the elastic members on the movement side in the direction of rotation of a frictional member which is driven are compressed and the elastic members on the opposing side of the movement side in the direction of rotation of the frictional member stretch themselves during the interval of time beginning when the frictional member is driven until a subsequent frictional member is driven. Therefore, the hysteresis torque gradually increases, and, as a result, the buildup of hysteresis torque decreases the instant that the subsequent frictional member operates. The result of the above is that the knocking sound during high hysteresis torque is reduced.

A frictional resistance generation mechanism according to a twenty-seventh aspect of the present invention is the mechanism of the twenty-sixth aspect wherein, the elastic members are disposed between the frictional members in a compressed state in the direction of rotation. As a result, the elastic members can maintain a correct posture between each of the frictional members even when extended in the direction of rotation from their initial state.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

(1) Structure

1) Overall Structure

Figure 1:
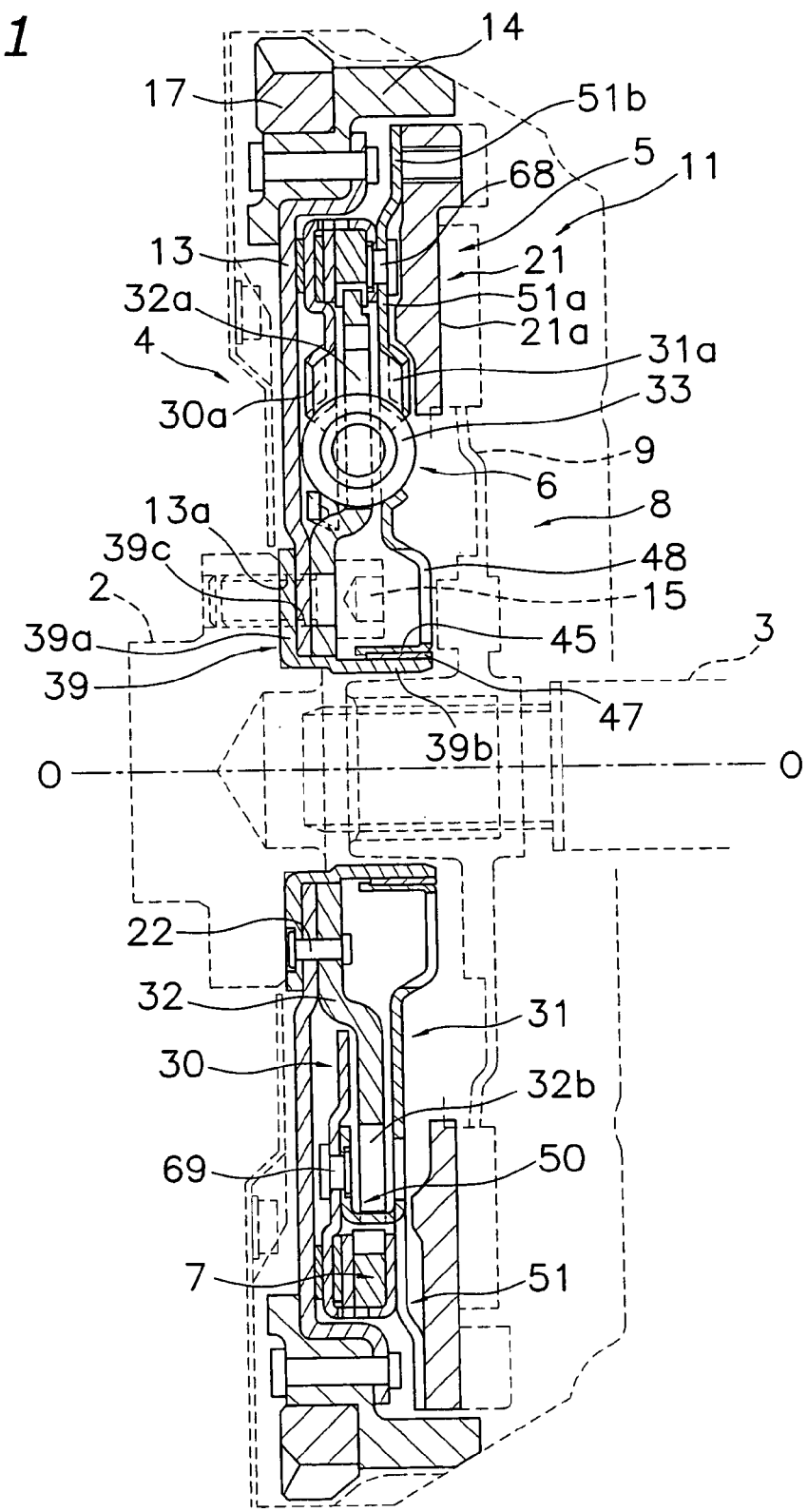
FIG. 1 is a schematic longitudinal cross-sectional view of a clutch device in accordance with a preferred embodiment of the present invention.
Figure 4:
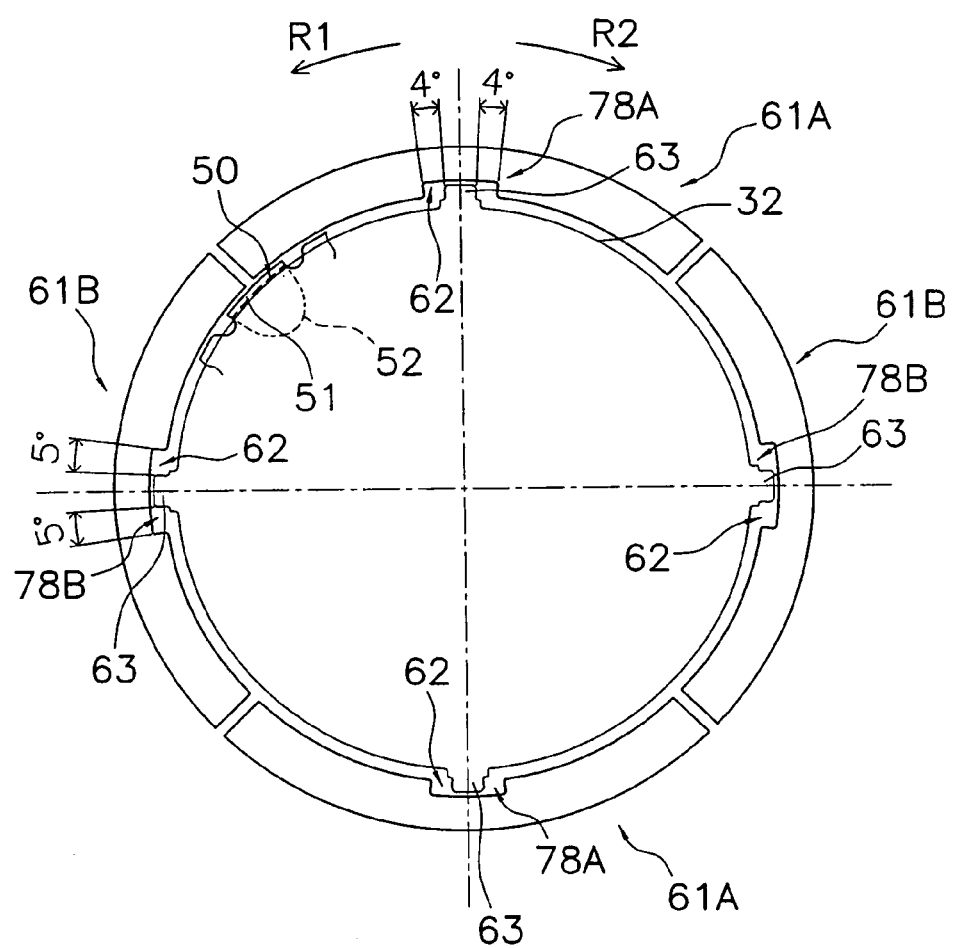
FIG. 4 is a schematic elevational view depicting the structure of the frictional resistance generation mechanism.

Referring to FIG. 1, a flywheel damper 11 in accordance with a first preferred embodiment is shown. The flywheel damper 11 transmits torque from a crankshaft 2 on the engine side to an input shaft 3 on the transmission side by way of a clutch 8. The flywheel damper 11 has a damper function to absorb and to attenuate torsional vibrations. The flywheel damper 11 has a first flywheel assembly 4, a second flywheel assembly 5, and a damper mechanism 6 arranged between the two assemblies 4 and 5. The line O-O in FIG. 1 is the axial line of rotation of the flywheel damper 11 and clutch 8. Further, the engine (not depicted) is disposed on the left-hand side of FIG. 1, and the transmission (not depicted) is disposed on the right-hand side. Hereinafter, the left-hand side in FIG. 1 will be referred to as the axial-direction engine side, and the right-hand side will be referred to as the axial-direction transmission side. The direction in which the arrow R1 points in FIG. 4 is the drive side (positive rotational direction), and the direction in which the arrow R2 points is the reverse drive side (negative rotational direction).

The actual numbers in the embodiments described below relate to an example and do not limit the present invention.

2) First Flywheel Assembly

Figure 2:
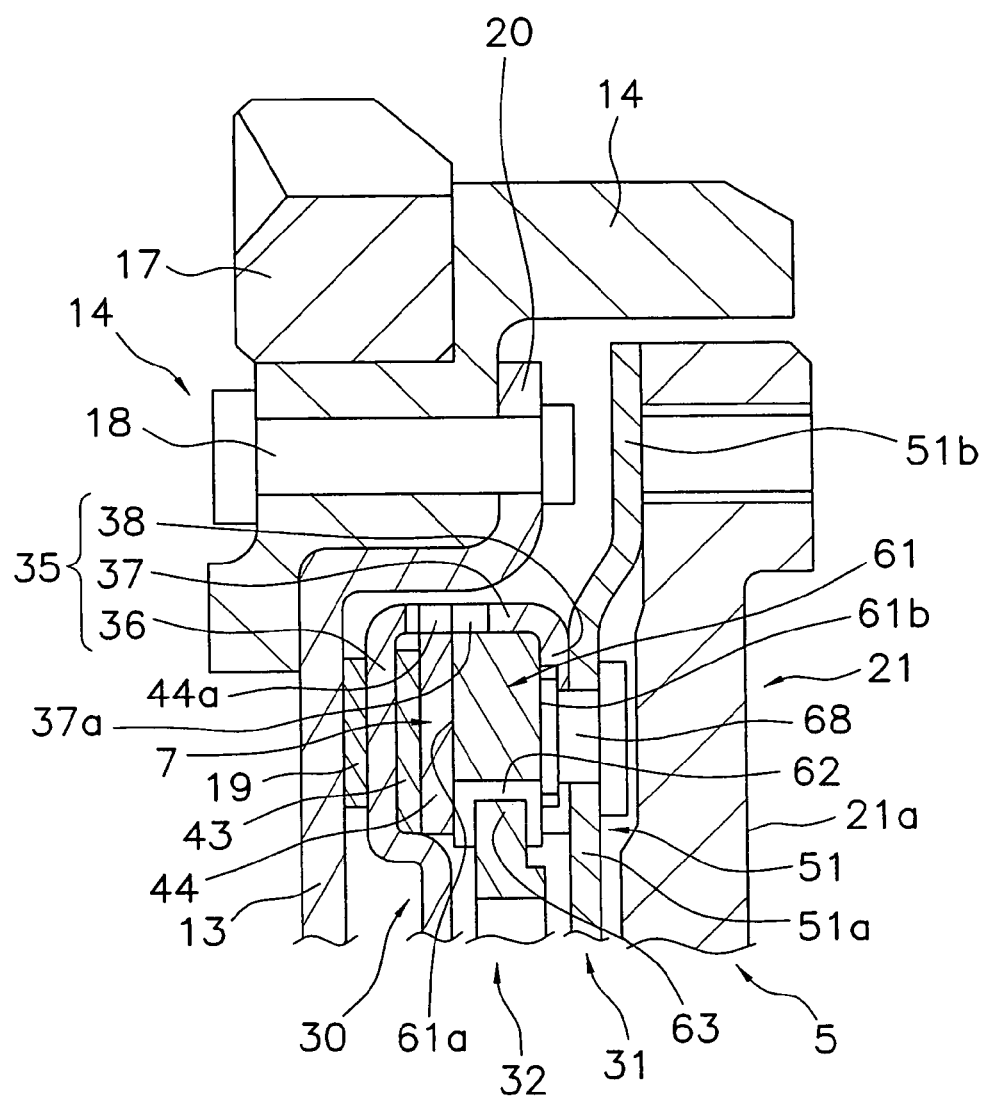
FIG. 2 is an enlarged view of a portion of FIG. 1 illustrating a frictional resistance generation mechanism of the clutch device.

Referring to FIGS. 1 and 2, the first flywheel assembly 4 is fixed to a tip of the crankshaft 2. The first flywheel assembly 4 ensures a large moment of inertia on the crankshaft side. The first flywheel assembly 4 principally has a disk-like member 13, an annular member 14, and a support plate 39 (described hereinafter). A radially inner edge of the disk-like member 13 is fixed to the tip of the crankshaft 2 by a plurality of bolts 15. Bolt through-holes 13a are formed in the disk-like member 13 in positions corresponding to the bolts 15. The bolts 15 are mounted on the crankshaft 2 from the axial-direction transmission side. The annular member 14 has a relatively thick block shape when viewed cross-sectionally, and is fixed to the axial-direction engine side on the radially outer edge of the disk-like member 13. More specifically, the annular member 14 is connected to an engine side of the disk-like member 13 but has a portion that axially extends past the disk-like member 13 toward the transmission. The radially outer portion 20 of the disk-like member 13 is fixed to the annular member 14 by a plurality of rivets 18 aligned in the circumferential direction. A ring gear 17 for engine startup is fixed to the radially outer surface of the annular member 14. The first flywheel assembly 4 may also be constructed as an integral member.

Figure 3:
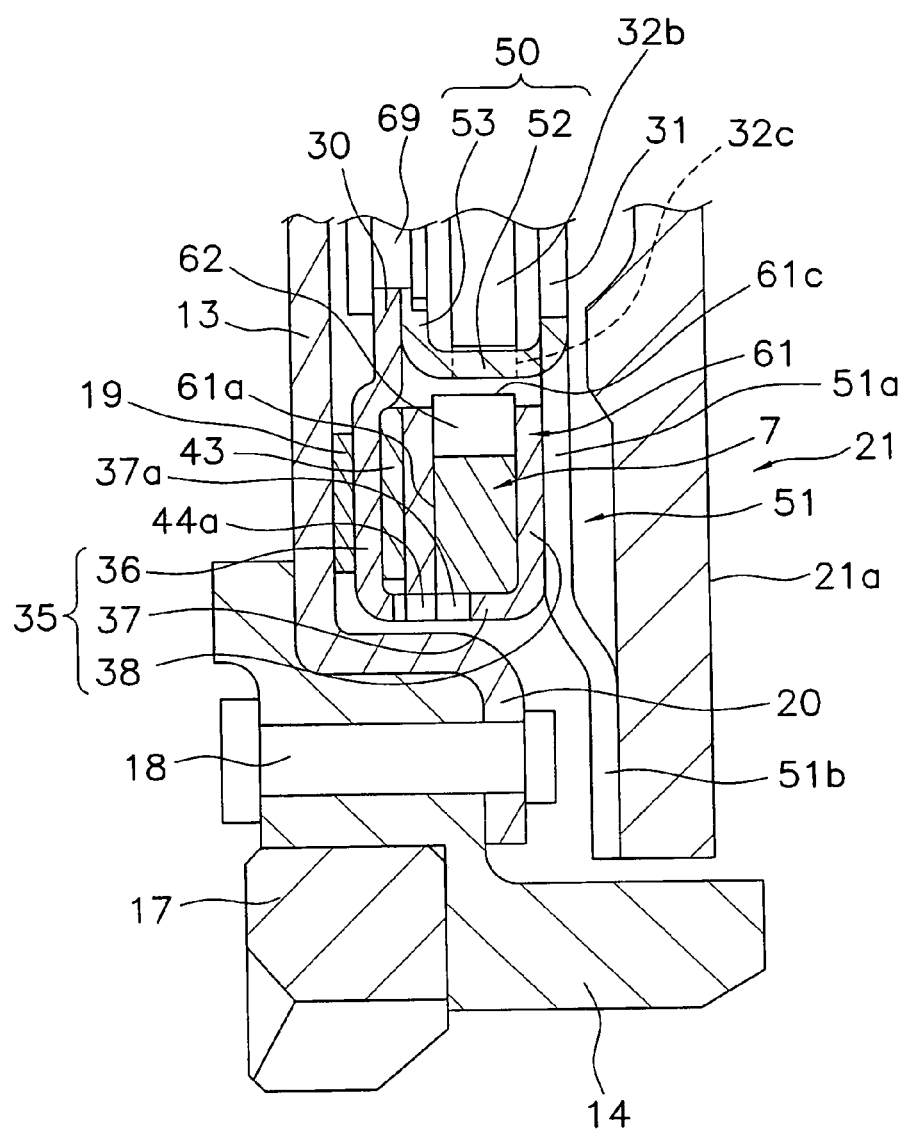
FIG. 3 is an enlarged view of a another portion of FIG. 1 illustrating the structure of the frictional resistance generation mechanism.

The structure of the radially outer portion of the disk-like member 13 is described in detail below. As shown in FIGS. 2 and 3, the radially outer portion of disk-like member 13 has a flat shape, and a frictional member 19 is attached to the axial-direction transmission side. The frictional member 19 has a plurality of arc-shaped members, forming an annular shape as a whole. The frictional member 19 functions to reduce the impact that occurs when the first flywheel assembly 4 and the second flywheel assembly 5 engage; and additionally contributes as a relative rotation restraining mechanism to stop quickly relative rotation during engagement. The frictional member 19 may also be fixed to a first portion 36 (described hereinafter).

Referring now to FIGS. 1, 2, and 3, the support plate 39 of the first flywheel assembly 4 supports the second flywheel assembly 5 in the radial direction in relation to the first flywheel assembly 4. The support plate 39 is composed of a disk-like portion 39a and a cylindrical portion 39b that extends to the axial-direction transmission side from the radially inner edge. The disk-like portion 39a is disposed between the disk-like member 13 and the tip surface of crankshaft 2 in the axial direction. Bolt through-holes 39c are formed in the disk-like portion 39a in positions corresponding to the bolt through holes 13a. According to the above-described structure, the support plate 39 is fixed to the crankshaft 2 by the bolts 15 along with the disk-like member 13 and the input side disk-like plate 32. The support plate 39, the disk-like member 13, and the input side disk-like plate 32 (described hereinafter) are fixed to each other with a plurality of rivets 22.

3) Second Flywheel Assembly

The second flywheel assembly 5 is principally composed of a flywheel 21 with a friction surface. The flywheel 21 with a friction surface is an annular disk-like member, and is disposed on the axial-direction transmission side of the radially outer portion of the first flywheel assembly 4. The flywheel 21 with a friction surface has a friction surface 21a formed on the axial-direction transmission side. The friction surface 21a is an annular, flat surface, and is a portion that is engaged by a clutch disk assembly 9 described hereinafter.

4) Damper Mechanism

The damper mechanism 6 is described below. The damper mechanism 6 elastically engages the flywheel 21 with a friction surface and the crankshaft 2 in the rotational direction, and is composed of a plurality of coil springs 33, a pair of output side disk-like plates (output rotary members, second rotating member) 30 and 31, and an input side disk-like plate (input rotary members, first rotating member) 32. The coil spring 33 is disposed parallel to the frictional resistance generation mechanism 7 in the direction of rotation, as shown in the mechanical circuit diagram in FIG. 6.

Referring again to FIGS. 1, 2, and 3, the pair of output side disk-like plates 30 and 31 is composed of a first plate 30 on the axial-direction engine side, and a second plate 31 on the axial-direction transmission side. Both plates 30 and 31 are disk-like members, and are disposed to maintain a certain distance therebetween in the axial direction. A plurality of windows 30a and 31a aligned in the circumferential direction are respectively formed in the plates 30 and 31. The windows 30a and 31a are structures that support the coil spring 33 (described hereinafter) in the axial direction and in the direction of rotation, hold the coil spring 33 in the axial direction, and have upwardly cut portions that make contact at both ends in the circumferential direction thereof.

The first plate 30 has a frictional member accommodation portion 35 in the radially outer portion. The frictional member accommodation portion 35 is composed of a first portion 36, a second portion 37, and a third portion 38, as shown in FIGS. 2 and 3. The first portion 36 is an annular disk-like portion that has a flat shape and is adjacent to the frictional member 19 of the disk-like member 13. The second portion 37 is a cylindrical portion that extends from the radially outer edge of the first portion 36 to the axial-direction transmission side. The third portion 38 is an annular disk-like portion that has a flat shape and extends from the tip of the second portion 37 to the edge side in the radial direction. The third portion 38 faces the first portion 36 in the axial direction.

The structure of the second plate 31 is described in greater detail below with reference to FIGS. 2, 3 and 4. A first engaging portion 50 and a second engaging portion 51 are formed alternately in the direction of rotation in the radially outer portion of the second plate 31. The first engaging portion 50 extends toward the engine, in other words, toward the first plate 30 in the axial direction, and is composed of an axial direction extension 52 and a fixed portion 53 that extends from the tip thereof inward in the radial direction. The tip of the extension 52 is roughly positioned slightly inward in the radial direction from the first portion 36 of the first plate 30. The principal plane of the extension 52 faces both sides in the radial direction, that is, the width in the radial direction matches the thickness of the plate. The fixed portion 53 is in contact with the transmission side surface in the axial direction of the first plate 30. The second engaging portion 51 is composed of an radially inner portion 51a that is in contact with the transmission side surface in the axial direction of the first plate 30, and an radially outer portion 51b that is in contact with the engine side surface in the axial direction of the radially outer portion of the flywheel 21 with a frictional surface. The radially outer portion 51b is fixed to the flywheel 21 by a frictional surface with the aid of a member that is not depicted, allowing the second plate 31 to rotate integrally with the flywheel 21 with a frictional surface. The radially inner portion 51a is fixed to the third portion 38 by a rivet 68, and the fixed portion 53 is fixed by a rivet 69. Thus, the plates 30 and 31 are fixed to each other to rotate integrally, and the distance in the axial direction between the plates 30 and 31 is maintained.

As seen in FIG. 1, a cylindrical portion 45 that extends in the axial direction is formed on the radially inner edge of the second plate 31. The radially inner surface of the cylindrical portion 45 is supported by the radially outer surface of the cylindrical part 39b of the support plate 39 by way of a bushing 47. Thus, the flywheel 21 with a friction surface is centered on the first flywheel assembly 4 and the crankshaft 2 by the support plate 39. A plurality of holes 48 for mounting the bolt 15 from the axial-direction transmission side is formed in the radially outer portion of the second plate 31.

The input side disk-like plate 32 is a disk-like member axially disposed between the plates 30 and 31. The input side disk-like plate 32 has a plurality of window holes 32a that extend in the circumferential direction. Further, the coil springs 33 are disposed in the window holes 32a. Cutaway areas 32b that allow the rivets 68 to pass therethrough in the axial direction are formed in portions between the window holes 32a in the circumferential direction in the input side disk-like plate 32

The coil springs 33 are made of a spring or spring assembly in which a large and a small spring are combined. The coil springs 33 are housed in the window holes 32a and the window portions 30a and 31a, and are supported on both sides in the radial direction and on both sides in the rotational direction; and the coil springs 33 are supported on both sides in the axial direction by the window portions 30a and 31a.

5) Frictional Resistance Generation Mechanism

The frictional resistance generation mechanism 7 functions in parallel with the coil springs 33 between the output side disk-like plates 30 and 31 and the input side disk-like plate 32 of the damper mechanism 6 in the rotation direction, and generates a prescribed frictional resistance (hysteresis torque) when the crankshaft 2 rotates in relation to the flywheel 21 with a frictional surface. As seen in FIGS. 2 and 3, the frictional resistance generation mechanism 7 is disposed in the space that is made of the first portion 36, the second portion 37, and the third portion 38 of the first plate 30, and is composed of a plurality of washers that are in contact with each other. The frictional resistance generation mechanism 7 has, in order from the first portion 36 toward the third portion 38, a cone spring (urging member) 43, an output side friction plate 44, and friction washers or friction shims (frictional members) 61, as shown in FIGS. 2 and 3. Thus, the first plate 30 has a function for accommodating the frictional resistance generation mechanism 7 on the flywheel 21, so the number of components is reduced and the structure simplified when compared to conventional structures.

The cone spring 43 imparts a load in the axial direction to friction surfaces, and is interposed and compressed between the first portion 36 and the output side friction plate 44. Therefore, the cone spring 43 exerts an urging force on both members 36 and 44 in the axial direction. Pawls 44a formed on the radially outer edge of the output side friction plate 44 are engaged with cutaway areas 37a of the second portion 37. Thus, the output side of the friction plate 44 is prevented from rotating relative to the first plate 30 by this engagement, but is movable in the axial direction.

As shown in FIGS. 2 and 4, the friction shims 61 are composed of a plurality of members aligned and disposed in the direction of rotation, and each of these extends in the form of an arc. In this embodiment, there are a total of four friction shims 61. The friction shims 61 are interposed between the output side friction plate 44 and the third portion 38. In other words, the axial-direction engine side surface 61a of the friction shims 61 makes contact in a slidable manner with the axial-direction transmission side surface of the output side friction plate 44, and the axial-direction transmission side surface 61b of the friction shims 61 makes contact in a slidable manner with the axial-direction engine side surface of the third portion 38. Concavities 62 are formed on the radially inner surface 61c of the friction shims 61, as shown in FIG. 4. As shown in FIG.

Figure 5:
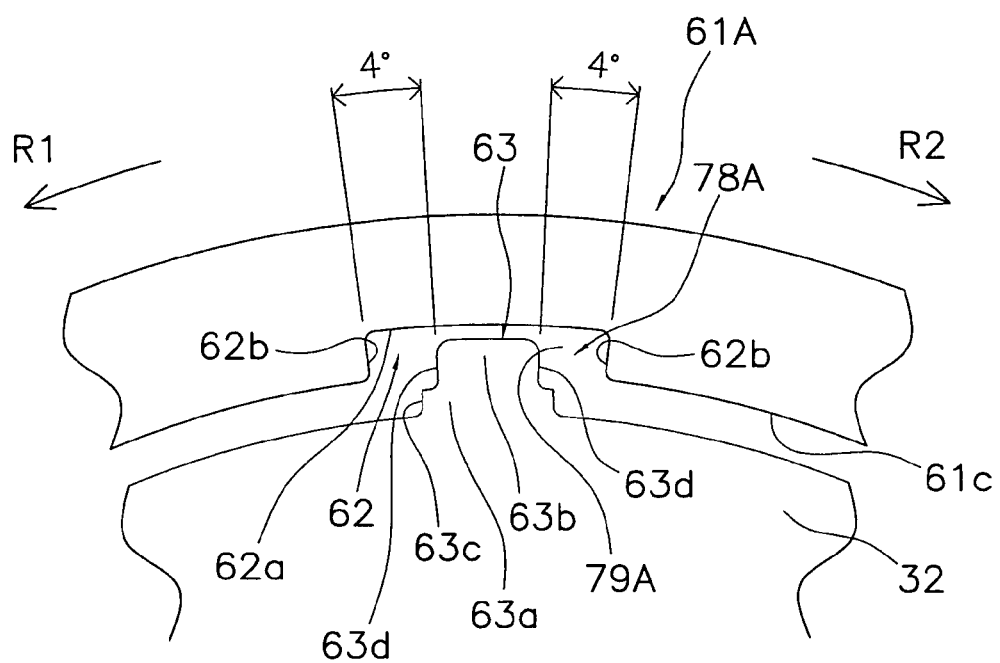
FIG. 5 is an enlarged view of a portion of FIG. 4 illustrating an engagement portion of the frictional resistance generation mechanism having convexities and concavities.

5, the concavities 62 are formed roughly in the rotation direction of the friction shims 61, and more specifically, have a bottom surface 62a extending in the direction of rotation, and a rotational direction end face 62b extending from both ends thereof in a roughly radially inward direction (roughly at a right angle from the bottom surface 62a). Referring now to FIGS. 3 and 5, the radially outer surface of the friction shims 61 follow the radially inner surface of the second portion 37, and are disposed adjacent thereto or in contact therewith.

A plurality of convexities or friction engagement portions 63 aligned in the direction of rotation is formed on the radially outer edge of input side disk-like plate 32. The convexities 63 are formed corresponding to the concavities 62 of the friction shims 61, and project radially outward. The convexities 63 are composed of a first portion 63a and a second portion 63b that extends outward in the radial direction therefrom. The width of the second portion 63b in the direction of rotation is narrower than that of the first portion 63a. Thus, as a result, a rotational direction end face 63d of the second portion 63b is positioned inward in the direction of rotation from a rotational direction end face 63c of the first portion 63a. The first portion 63a is disposed in the same radial position as the extension portion 52 of the first engaging portion 50, and both of these include a stopper in the damper mechanism 6. However, the stopper mechanism may be made of other components. The second portion 63b is disposed in the concavities 62. Thus, an engagement portion 78 in the frictional resistance generation mechanism 7 is formed by the convexities 63 and concavities 62.

The engagement portion 78 is described below. The second portion 63b in the convexities 63 has a roughly square shape, and has rotational direction end faces 63d. The convexities 63 are adjacent to the bottom surface 62a in the concavities 62, and a rotational direction gap 79 with a certain angle is obtained respectively between the end face 63d and the rotational direction end face 62b in each rotational direction. The total of both angles is a prescribed angle whose size allows the friction shim 61 thereof to rotate relative to the input side disk-like plate 32. This angle is preferably within a range that is equal to or slightly exceeds the damper operation angle created by small torsional vibrations caused by combustion fluctuations in the engine.

In this embodiment, the convexities 63 are disposed at the center of the direction of rotation of the concavities 62 in the neutral state shown in FIG. 5. Therefore, the size of the gap on each side of the convexities 63 in the direction of rotation is the same.

Referring again to FIGS. 3 and 5, as described above, the friction shim 61 is frictionally engaged with the third portion 38 and the output side friction plate 44 (which is an output side member), and also is engaged with the input side disk-like plate 32 (which is an input side member) in a manner that allows torque to be transmitted by way of the rotational direction gap 79 of the engagement portion 78.

Next, the relationship between the friction shim 61 and the convexities 63 is described in greater detail. The widths in the direction of rotation (the angles in the direction of rotation) of the convexities 63 (more accurately, the second portion 63b) are all the same, but some of the widths in the direction of rotation (the angles in the direction of rotation) of the concavities 62 may be different. That is to say, as shown in FIG. 4, there are at least two types of friction shims 61 with differing widths in the direction of rotation of the concavities 62. In this embodiment, these are composed of two first friction shims 61A that face each other in the up and down directions of FIG. 4, and two second friction shims 61B that face each other in the left and right directions. The first friction shims 61A and the second friction shims 61B have roughly the same shape, and are made of the same material. The only point in which these differ is the width in the direction of rotation (the angles in the direction of rotation) of the rotational direction gap of the concavities 62. More specifically, the width in the direction of rotation of the concavities 62 of the second friction shims 61B is larger than the width in the direction of rotation of the concavities 62 of the first friction shims 61A. As a result, the second rotational direction gap 79B of the second engagement portion 78B in the second friction shims 61B is larger than the first rotational direction gap 79A of the first engagement portion 78A in the first friction shims 61A. In this embodiment, the former is preferably 10° and the latter is 8°, and the difference is 2°, for example.

The first friction shims 61A and the second friction shims 61B are disposed and aligned in an alternating manner in the direction of rotation, and both edges thereof in the direction of rotation are adjacent to each other. The angle between the edges in the direction of rotation is set to a value that is greater than the difference (2°, for example) between the second rotational direction gap 79B in the second friction shims 61B and the first rotational direction gap 79A in the first friction shims 61A.

6) Clutch Disk Assembly

As shown in FIG. 1, the clutch disk assembly 9 of the clutch 8 has a friction facing that is disposed adjacent to the friction surface 21a of the flywheel 21 with a friction surface, and a hub that is spline-engaged with the transmission input shaft 3.

(2) Operation

1) Torque Transmission

In this flywheel damper 11, the torque from the engine crankshaft 2 is input to the flywheel damper 11, and is transmitted from the first flywheel assembly 4 to the second flywheel assembly 5 by way of the damper mechanism 6. In this damper mechanism 6, the torque is transmitted in order from the input side disk-like plate 32, the coil spring 33, and the output side disk-like plates 30 and 31. In addition, the torque is transmitted from the flywheel damper 11 to the clutch disk assembly 9 with the clutch in an engagement state, and is finally output to the input shaft 3.

2) Absorption and Attenuation of Torsional Vibrations

When a combustion fluctuation from the engine is input to flywheel damper 11, the output side disk-like plates 30 and 31 rotate relative to the input side disk-like plate 32 in the damper mechanism 6, and the four coil springs 33 are compressed in parallel therebetween. In addition, the frictional resistance generation mechanism 7 generates a prescribed hysteresis torque. The torsional vibration is absorbed and attenuated by the above-described operation.

The compression in coil springs 33 is specifically carried out between the end face in the rotational direction of the window portions 30a and 31a of the output side disk-like plates 30 and 31, and the end face in the rotational direction of the window hole 32a of the input side disk-like plate 32. The coil springs 33 are compressed and high-rigidity characteristics are obtained. More accurately, compression occurs.

Referring now to FIGS. 2, 3, and 4, in the frictional resistance generation mechanism 7, the friction shims 61 rotate integrally with the input side disk-like plate 32, and also rotate in a relative fashion with respect to the output side friction plate 44 and the first plate 30. As a result, the friction shims 61 slide on the third portion 38 of the first plate 30 and on the output side friction plate 44, and a comparatively large frictional resistance is generated.

2)-1 Small Torsional Vibrations

Figure 6:
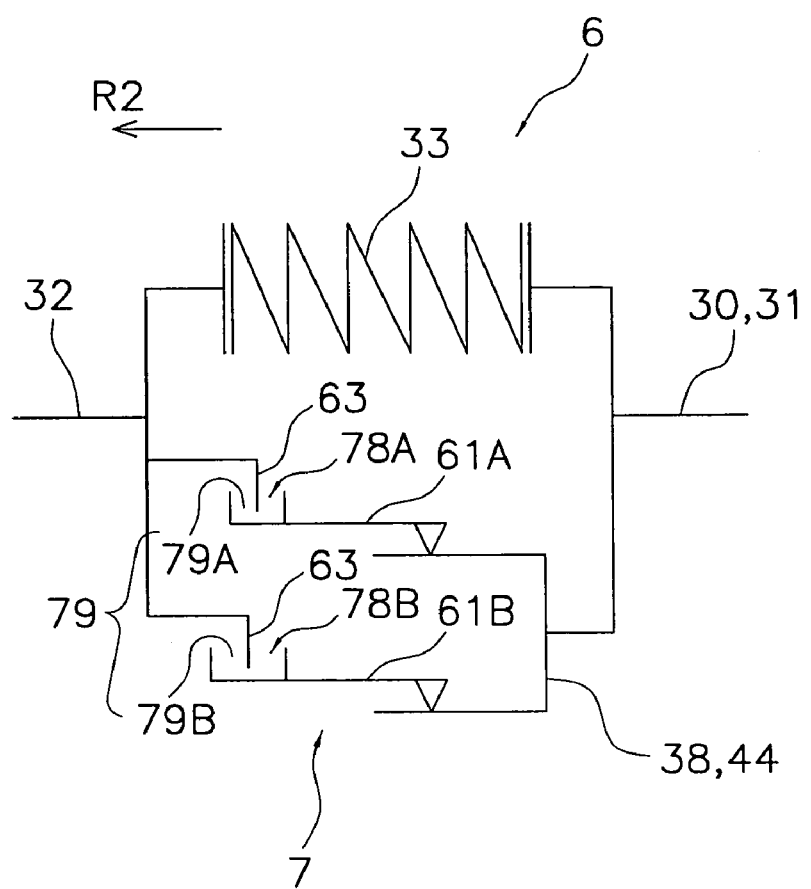
FIG. 6 is a view of a mechanical circuit diagram of a damper mechanism of the clutch device.

The operation of the damper mechanism 6 when small torsional vibrations caused by combustion fluctuations of the engine are inputted to the flywheel damper 11 is described below with reference to the mechanical circuit diagram in FIG. 6 and the diagrams of torsional characteristics in FIGS. 10 to 13.

When small torsional vibrations are inputted, the input side disk-like plate 32 in the frictional resistance generation mechanism 7 rotates relative to the friction shim 61 in the rotational direction gap 79 between the convexities 63 and the concavities 62. In other words, the friction shim 61 is not driven with the input side disk-like plate 32, and the friction shim 61 therefore does not rotate in relation to the member on the output side. As a result, high hysteresis torque is not generated for small torsional vibrations. That is, the coil spring 33 does not operate at "AC 2HYS", for example, in the diagram of torsional characteristics in FIG. 10, and slippage does not occur in the frictional resistance generation mechanism 7. That is to say, only a hysteresis torque that is much smaller than normal hysteresis torque can be obtained in a prescribed range of torsion angles. Thus, the vibration and noise level can be considerably reduced because a very narrow rotational direction gap is provided in which the frictional resistance generation mechanism 7 does not operate in the prescribed angle range.

Next, the operation performed when the friction shim 61 is driven by the input side disk-like plate 32 is described. The operation in which the input side disk-like plate 32 is twisted from the neutral state shown in FIGS. 4 and 5 in the rotation direction R1 in relation to the friction shim 61 is described.

Figure 7:
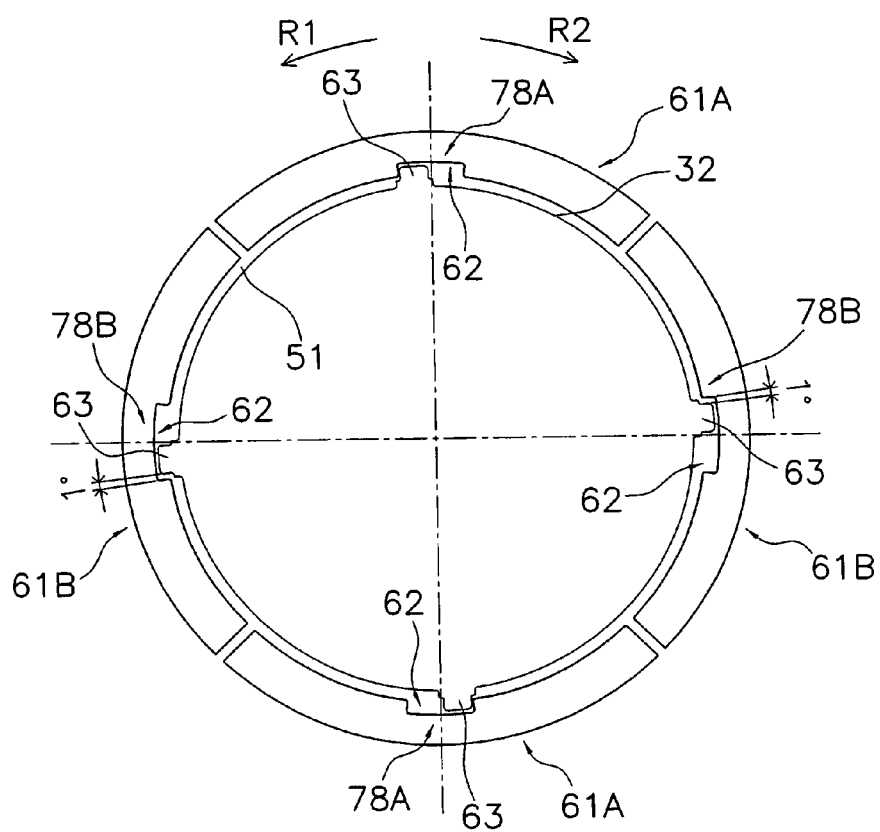
FIG. 7 is a schematic plan view depicting the operation of the frictional resistance generation mechanism.
Figure 8:
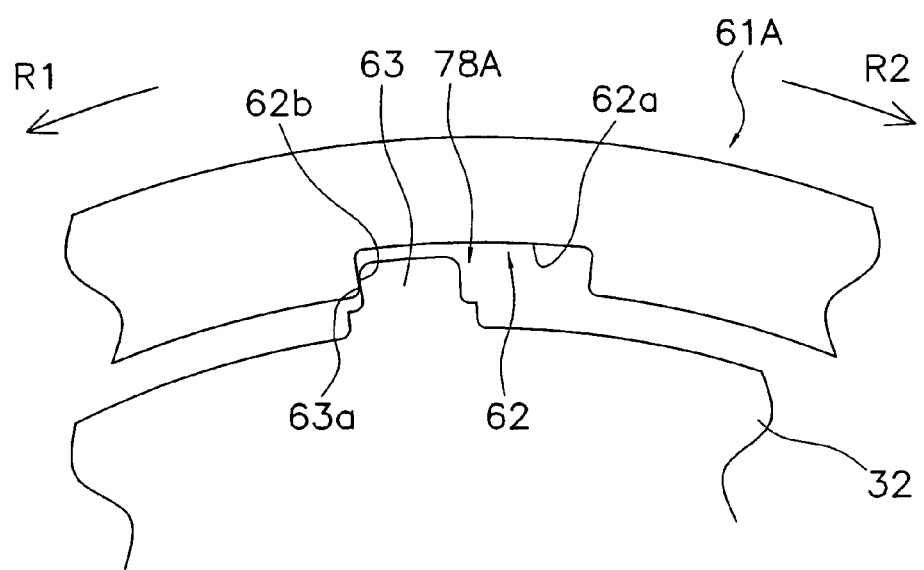
FIG. 8 is an enlarged view of a portion of FIG. 7 illustrating the structure of the frictional resistance generation mechanism.

Referring to FIGS. 7 and 8, when the torsion angle increases, the convexities 63 in the first friction shims 61A eventually make contact with the rotational direction end face 62b on the side in the rotational direction R1 of the concavities 62 of the first friction shims 61A. At this time, the convexities 63 in the second friction shims 61B have a rotational direction gap (which is half the difference between the second rotation direction gap 79B of the second friction shims 61B and the first rotational direction gap 79A of the first friction shims 61A, and is 1° in this embodiment) in the rotational direction end face 62b of the concavities 62 of the second friction shims 61B in the rotational direction R1.

Referring again to FIGS. 6 and 9, when the torsion angle further increases, the convexities 63 drive the first friction shims 61A, and cause them to slide in relation to the output side friction plate 44 and the third portion 38. At this time, the first friction shims 61A approach the second friction shims 61B in the rotational direction R1, but the edge portions of both of these do not make contact.

Figure 9:
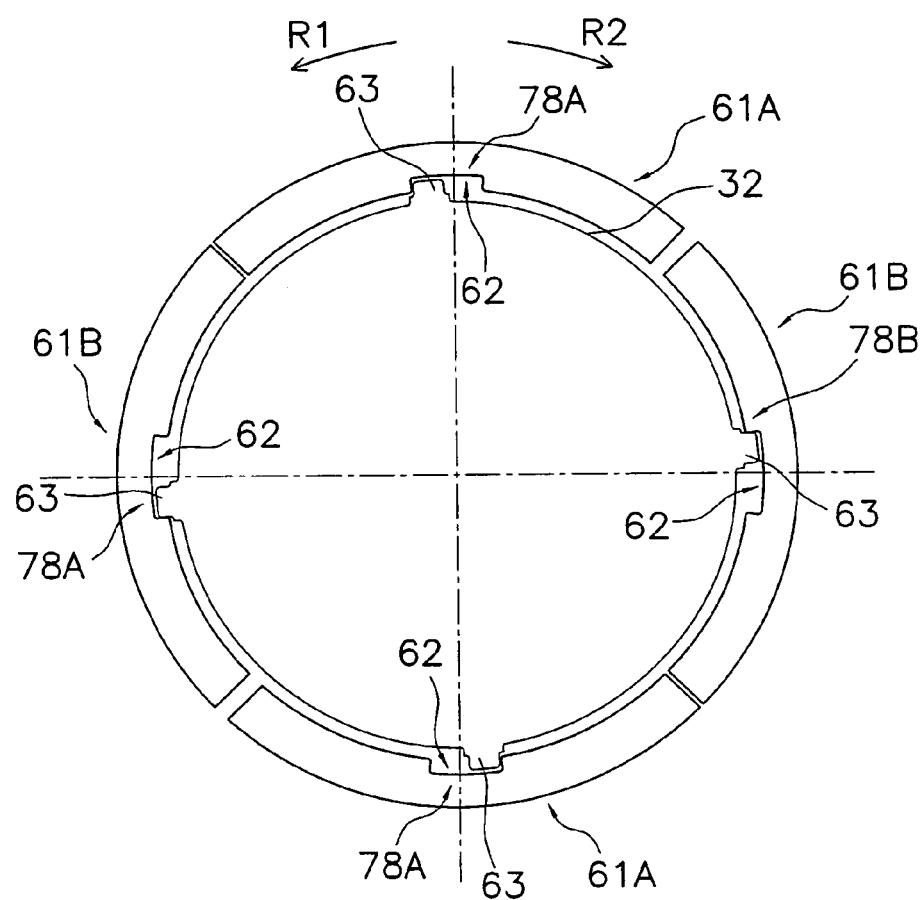
FIG. 9 is a schematic elevational view further illustrating the operation of the frictional resistance generation mechanism.

When the torsion angle finally realizes a prescribed magnitude, the convexities 63 make contact with the rotational direction end face 62b of the concavities 62 of the second friction shims 61B, as shown in FIG. 9. After this, the input side disk-like plate 32 drives both the first and second friction shims 61A and 61B, causing them to slide in relation to the third portion 38 and the output side friction plate 44.

In summation, driving the friction shim 61 with the aid of the input side disk-like plate 32 yields an area in which a constant number of plates is driven to generate an intermediate frictional resistance in the torsion characteristics before the start of the large frictional resistance area in which all of the plates are driven.

Figure 11:
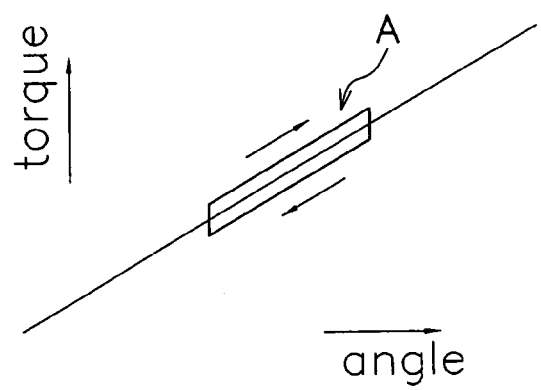
FIG. 11 is a view of a detailed diagram of the torsional characteristics of the damper mechanism.
Figure 12:
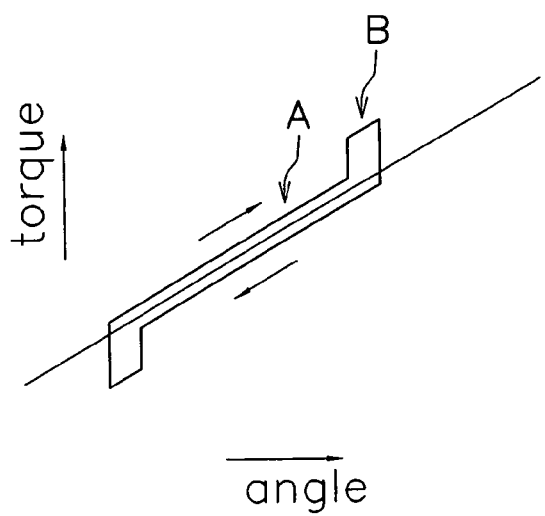
FIG. 12 is a view of a detailed diagram of the torsional characteristics of the damper mechanism.
Figure 13:
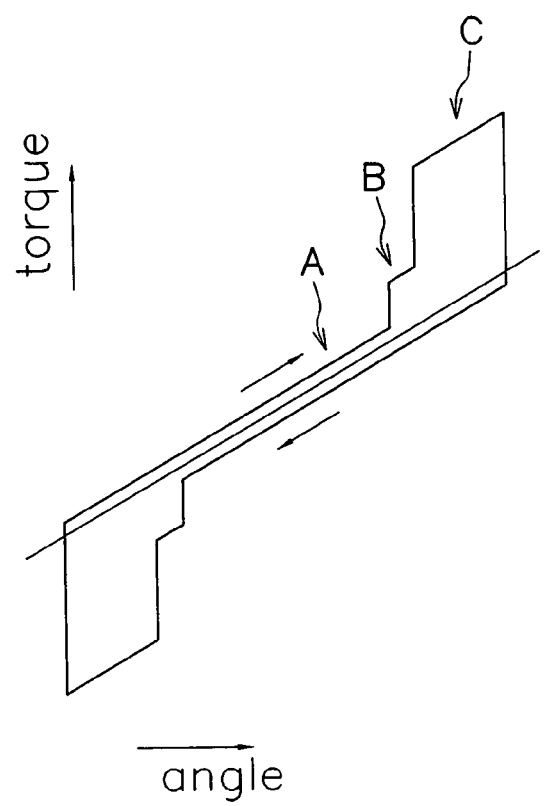
FIG. 13 is a view of a detailed diagram of the torsional characteristics of the damper mechanism.

As a result, when the operating angle of the torsional vibration is equal to or less than the angle (8°, for example) of the first rotational direction gap 79A of the first engagement portion 78A of the first friction shims 61A, large frictional resistance (high hysteresis torque) is not generated at all and only area A of low frictional resistance is obtained in the second stage of torsion characteristics, as shown in FIG. 11. Moreover, when the operating angle of the torsional vibration is equal to or greater than the angle (8°, for example) of the first rotational direction gap 79A of the first engagement portion 78A of the first friction shims 61A, and is equal to or less than the angle (10°, for example) of the second rotational direction gap 79B of the second engagement portion 78B of the second friction shims 61B, the area B of intermediate frictional resistance is generated on the edge of the area A of low frictional resistance, as shown in FIG. 12. When the operating angle of the torsional vibration is equal to or less than the angle (10°, for example) of the second rotational direction gap 79B of the second engagement portion 78B of the second friction shims 61B, the area B of intermediate frictional resistance and the area C in which a constant large frictional resistance is generated are respectively obtained on both edges of the area A of low frictional resistance, as shown in FIG. 13.

2)-2 Wide-Angle Torsional Vibrations

Referring again to FIG. 6, as described above, when the torsional angle of the torsional vibration is large, the friction shims 61 slide against the first plate 30. As a result, a frictional resistance with a constant magnitude is obtained over the entire range of torsional characteristics.

Figure 10:
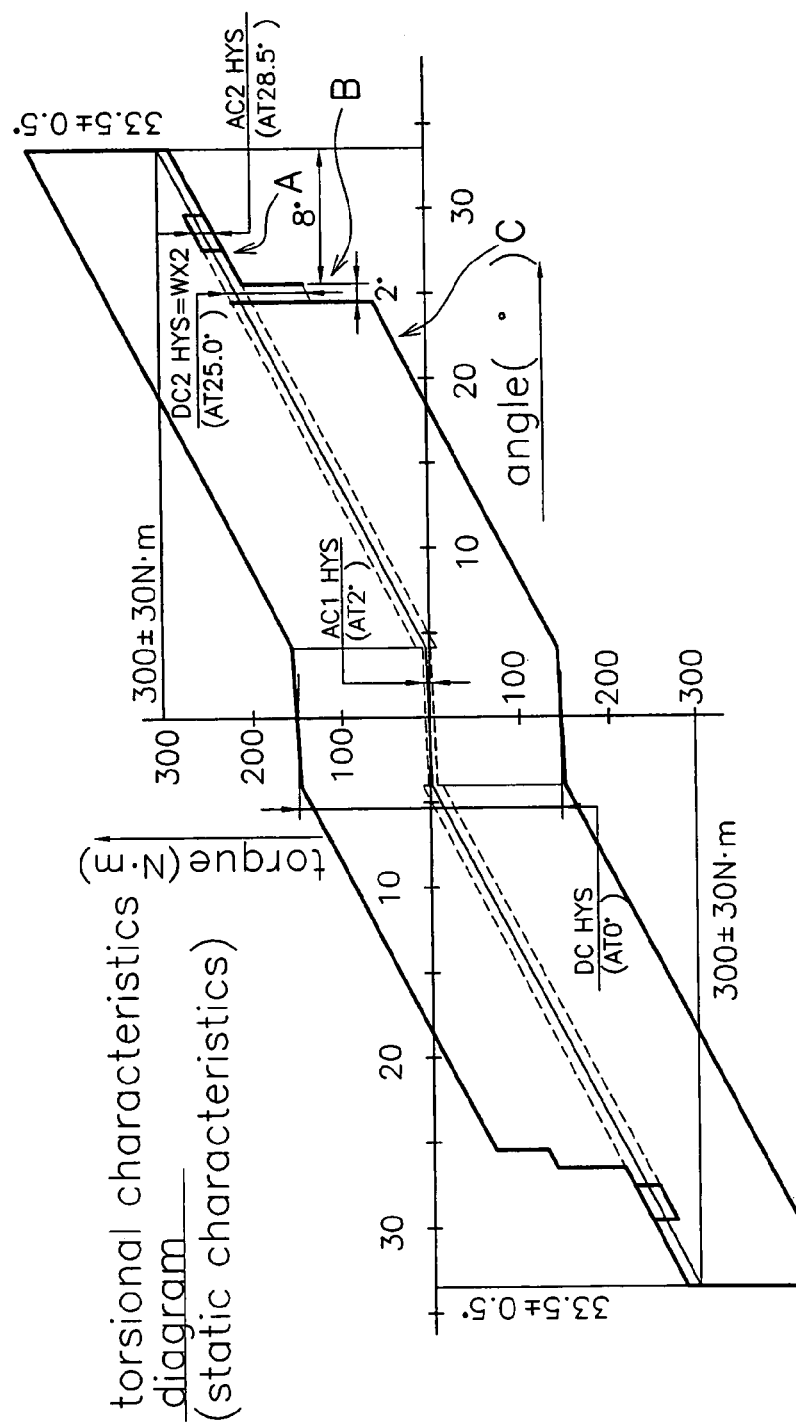
FIG. 10 is a view of a diagram of the torsional characteristics of the damper mechanism.

Here, the operation in the edge portion (position in which the direction of the vibration changes) of the torsion angle is described with reference to FIGS. 6 and 10. At the right-hand edge of the torsion characteristic line chart of FIG. 10, the friction shim 61 shifts toward its most rotational direction R2 position in relation to the input side disk-like plate 32. When input side disk-like plate 32 twists from this state toward the rotational direction R2 in relation to the output side disk-like plates 30 and 31, the friction shims 61 rotate in relation to the input side disk-like plate 32 across the entire angle of the rotational direction gap 79 of the convexities 63 and concavities 62. In this interval, area A (8°, for example) of low frictional resistance can be obtained because the friction shims 61 do not slide against the member on the output side. Next, when the first rotational direction gap 79A of the first engagement portion 78A of the first friction shims 61A is no longer present, the input side disk-like plate 32 drives the first friction shims 61A. Then, the first friction shims 61A rotate relative to the output side friction plate 44 and the third portion 38. As a result, area B of intermediate frictional resistance (2°, for instance) is generated as described above. When the second rotational direction gap 79B of the second engagement portion 78B of the second friction shims 61B is no longer present, the input side disk-like plate 32 subsequently drives the second friction shims 61B. Then, the second friction shims 61B rotate relative to the output side friction plate 44 and the third portion 38. Area C of comparatively large frictional resistance is generated because both the first friction shims 61A and the second friction shims 61B slide at this time.

As described above, area B of intermediate frictional resistance is provided at an early stage when a large frictional resistance is generated. A barrier of high hysteresis torque does not exist when a large frictional resistance is generated because the buildup of large frictional resistance is graduated in this manner. As a result, the knocking sound of the pawls when high hysteresis torque is generated decreases in a frictional resistance generation mechanism with a very narrow rotational direction gap for absorbing small torsional vibrations.

In particular, the number of types of frictional members can be kept low in the present invention because a single type of friction shim 61 is used to generate intermediate frictional resistance. The friction shim 61 is also a simple structure that extends in the form of an arc. Furthermore, a through-hole in the axial direction is not formed in the friction shim 61, and thus, manufacturing costs can be kept low.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

ALTERNATE EMBODIMENTS

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

(3) Other Embodiments

An embodiment of the clutch mechanism in accordance with the present invention was described above, but the present invention is not limited to this embodiment and other variations or modifications that do not depart from the scope of the present invention are possible. More particularly, the present invention is not limited by the specific numerical values of angles and the like described above.

In the above-described embodiment, two size types of the rotational direction gap of the engagement portion were used, but it is also possible to use three or more size types. In the case of three size types, the magnitude of the intermediate frictional resistance will have two stages (the case of the third embodiment described hereinafter).

The coefficients of friction of the first frictional member and the second frictional member are the same as in the above-described embodiment, but these may also be varied (the case of the third embodiment described hereinafter). Thus, the ratio of the intermediate frictional resistance and large frictional resistance can be arbitrarily set by adjusting the frictional resistance generated by the first frictional member and the second frictional member.

In the above-described embodiment, intermediate frictional resistance is generated by providing convexities with an equal size and concavities with different sizes, but the concavities may be set to an equal size and the size of the convexities may be different. Furthermore, combinations of convexities and concavities with different sizes may also be used.

In the above-described embodiment, the friction shim faces the internal side in the radial direction, but it may also face the external side in the radial direction.

In addition, the friction shim in the above-described embodiment has concavities, but the friction shim may also have convexities. In this case, the input side disk-like plate has concavities, for example.

Furthermore, the friction shim in the above-described embodiment has a friction surface that is frictionally engaged with an output side member, but it may also have a friction surface that is frictionally engaged with an input side member. In this case, an engagement portion having a rotational direction gap is formed between the friction shim and an output side member (the case of the second embodiment described hereinafter).

(4) Second Embodiment

Another embodiment of the frictional resistance generation mechanism is described below with reference to FIGS. 14 to 17. The frictional resistance generation mechanism 107 is a mechanism that functions in parallel with a coil spring (not depicted) between a disk-like member 113 and output side disk-like plates 130 and 131 in the direction of rotation. When a flywheel 121 with a friction surface rotates relative to the crankshaft, a prescribed frictional resistance (hysteresis torque) is generated.

An annular first inertia member and second inertia member 114A and 114B are fixed to the radially outer portion of the disk-like member 113. The first inertia member 114A is disposed on the axial direction engine side, and the second inertia member 114B is disposed on the axial direction transmission side relative to each other. A disk-like plate member 115 is fixed between the first inertia member 114A and the second inertia member 114B. The radially inner portion of the plate member 115 extends from the radially inner surface 114a of the first inertia member 114A inward in the radial direction. In other words, the radially inner portion of the plate member 115 faces a portion of the disk-like member 113 in the axial direction, and forms an annular space with the radially inner surface 114a of the first inertia member 114A. The frictional resistance generation mechanism 107 is disposed in this space and is composed of a plurality of members in contact with each other.

Figure 15:
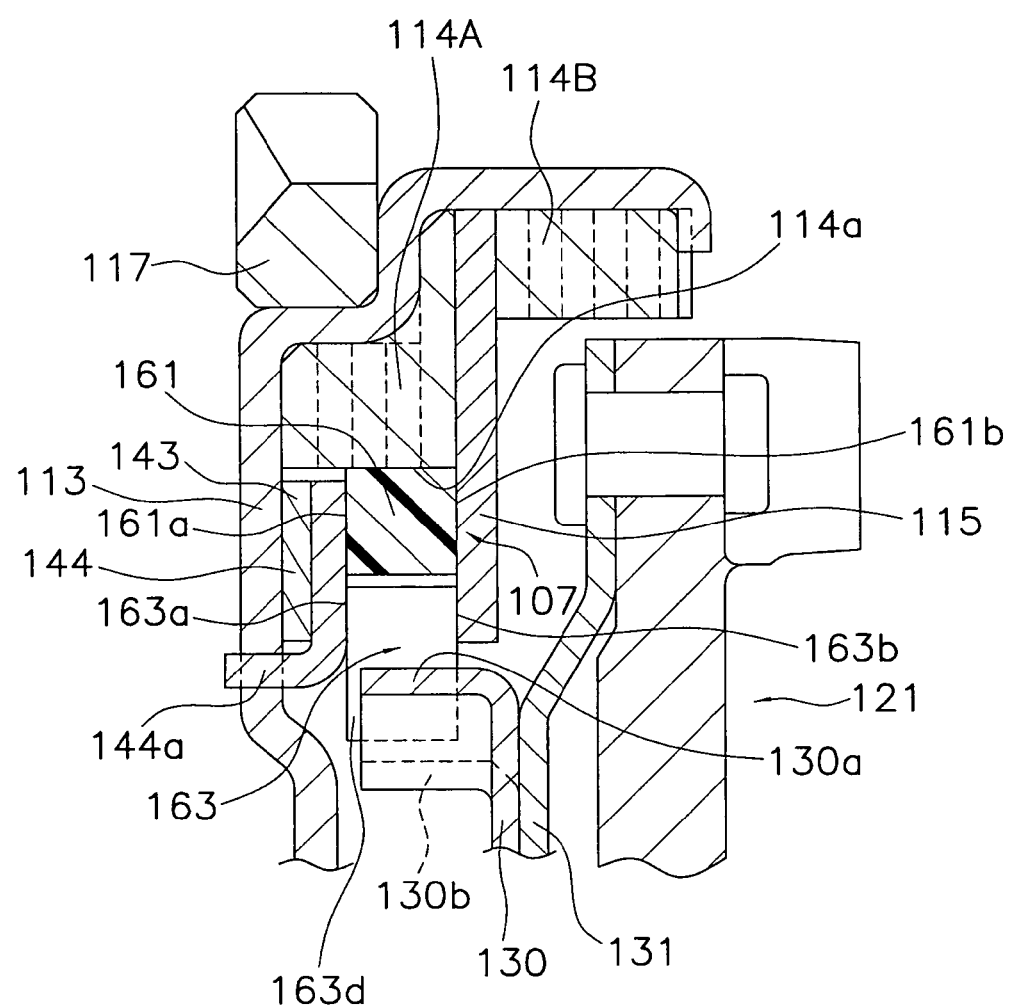
FIG. 15 is a cross-sectional view of the frictional resistance generation mechanism of the second embodiment.

As shown in FIG. 15, the frictional resistance generation mechanism 107 has, in order from the disk-like member 113 to the plate member 115, a cone spring 143, an input side friction plate 144, and friction shims 161. The cone spring 143 imparts a load in the axial direction to friction surfaces, and is interposed and compressed between the disk-like member 113 and the input side friction plate 144. Therefore, the cone spring 143 exerts an urging force on both members in the axial direction. Pawls 144a formed on the radially inner edge of the input side friction plate 144 extend to the axial direction engine side and are engaged with cutaway areas of the disk-like member 113. The input side of the friction plate 144 is prevented from rotating relative to the disk-like member 113 by this engagement, but is movable in the axial direction.

Figure 14:
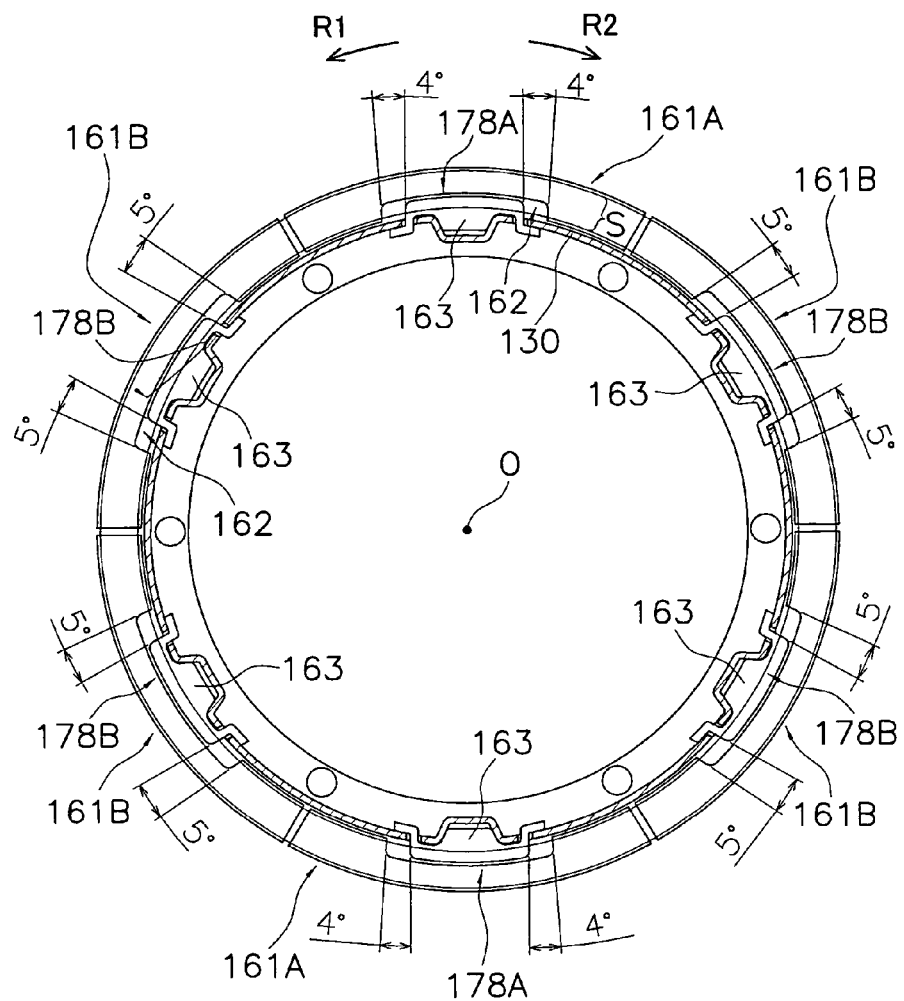
FIG. 14 is a schematic elevational view illustrating the structure of a frictional resistance generation mechanism in accordance with a second preferred embodiment of the present invention.
Figure 16:
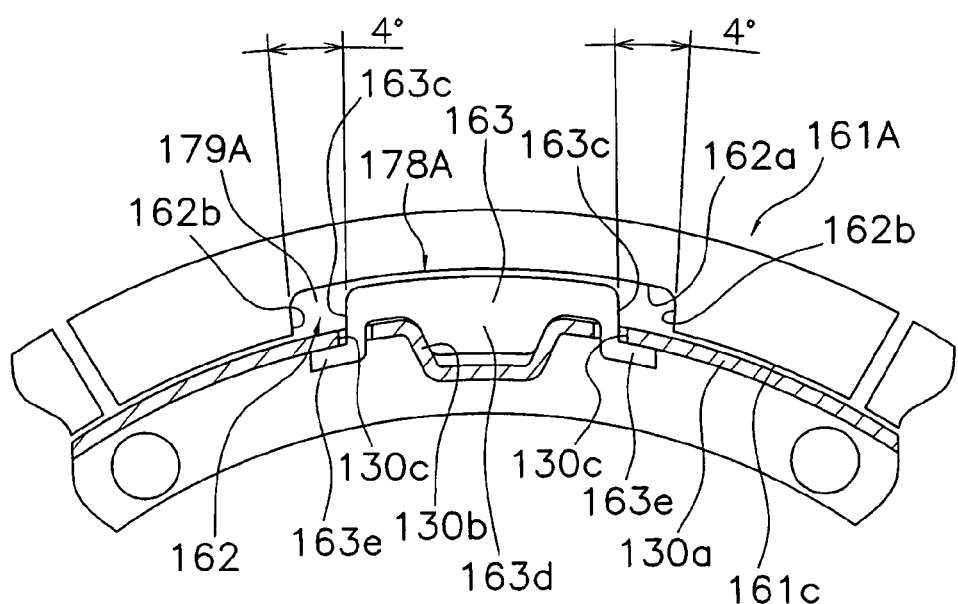
FIG. 16 is an enlarged view of a portion of FIG. 14 illustrating the structure of the frictional resistance mechanism of the second embodiment.

Referring now to FIGS. 14 and 15, the friction shims 161 are composed of a plurality of members aligned and disposed in the direction of rotation, and each of these extends in the form of an arc. In this embodiment, there are a total of six friction shims 161. The friction shims 161 are interposed between the input side friction plate 144 and the plate member 115. In other words, an axial-direction engine side surface 161a of the friction shims 161 make contact in a slidable manner with the axial-direction transmission side surface of the input side friction plate 144, and an axial-direction transmission side surface 161b of the friction shims 161 makes contact in a slidable manner with the axial-direction engine side surface of the plate member 115. Concavities 162 are formed on a radially inner surface 161c of the friction shims 161, as shown in FIGS. 14 and 16. The concavities 162 are formed roughly in the center of the direction of rotation of the friction shims 161, and, more specifically, have a bottom surface 162a extending in the direction of rotation, and a rotational direction end face 162b extending radially inwardly from both ends thereof in a roughly radial direction (roughly a right angle from the bottom surface 162a). Referring to FIG. 15, the radially outer surface of the friction shims 161 follows the radially inner surface 114a of the first inertia member 114A, and is disposed adjacent thereto or in contact therewith.

As seen in FIGS. 14 and 16, friction engagement members 163 are respectively disposed on the radially inner side of the friction shims 161, or, more specifically, on the inside of the concavities 162. As shown in FIG. 15, the radially outer portion of the friction engagement members 163 is interposed between the friction plate 144 and the plate member 115. In other words, the axial direction engine side surface 163a of the friction engagement members 163 makes contact in a slidable manner with the axial direction transmission side surface of the friction plate 144, and the axial direction transmission side surface 163b of the friction engagement members 163 makes contact in a slidable manner with the axial direction engine side surface of the plate member 115. The friction shim 161 and the friction engagement members 163 are both preferably composed of resin, and the coefficient of friction of the friction shim 161 is higher than the coefficient of friction of the friction engagement members 163.

Figure 17:
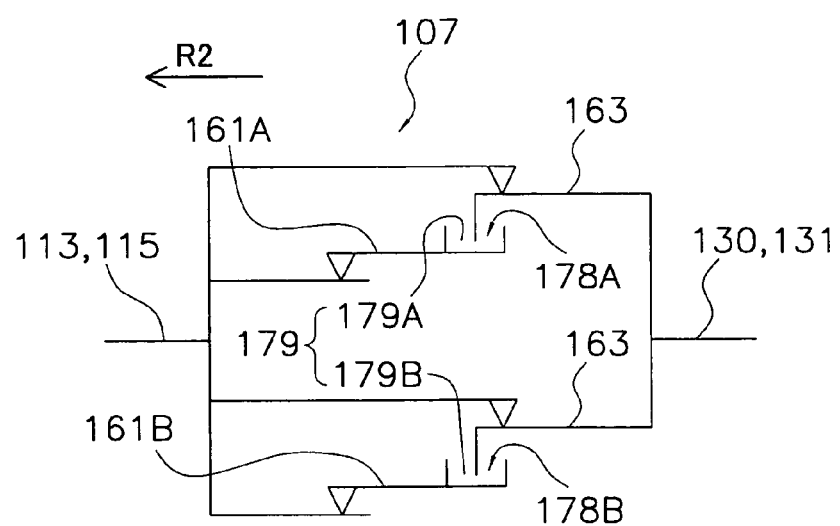
FIG. 17 is a view of a mechanical circuit diagram of the frictional resistance generation mechanism of the second embodiment.

With reference to FIGS. 14, 16, and 17, the friction engagement portion 178 including the friction engagement members 163 and the concavities 162 of the friction shim 161 is described below. The friction engagement members 163 have rotational direction end faces 163c. The radially outer surface of the friction engagement members 163 is adjacent to the bottom surface 162a of the concavities 162, and a rotational direction gap 179 with a prescribed angle is obtained between each of the end faces 163c and the rotational direction end faces 162b. The total of both angles is a prescribed angle whose size allows the friction shim 161 thereof to rotate relative to the friction engagement members 163. This angle is preferably within a range that is equal to or slightly exceeds the damper operation angle created by small torsional vibrations caused by combustion fluctuations in the engine. In this embodiment, the friction engagement members 163 are disposed in the center of the direction of rotation of the concavities 162 in the neutral state shown in FIG. 16. Therefore, the size of the gap of each friction engagement member 163 in the neutral state is the same on either side in the direction of rotation of the individual friction engagement member 163.

The friction engagement members 163 are engaged with the output side disk-like plate 130 to rotate in relation to the output side disk-like plate 130 and be movable in the axial direction. More specifically, as shown in FIGS. 15 and 16, an annular wall 130a extending toward the engine in the axial direction is formed on the radially outer edge of the output side disk-like plate 130, and concavities 130b indented on the internal side in the radial direction are formed corresponding to each friction engagement member 163 on the annular wall 130a. In addition, slits 130c are radially formed to extend through the wall on both sides of the concavities 130b in the direction of rotation. Each friction engagement member 163 has a pair of leg portions 163e that extend inward from the external side in the radial direction in each slit 130c, extend outward in the direction of rotation, and make contact with the radially inner surface of the annular wall 130a. As a result, the friction engagement members 163 do not move relative to the annular wall 130a to the outside in the radial direction. In addition, the friction engagement members 163 have convexities 163d that extend inward in the radial direction, and are engaged in the direction of rotation with the concavities 130b in the annular wall 130a. The friction engagement members 163 are thereby integrally rotated as convexities in the output side disk-like plate 130.

As described above, the friction shim 161 frictionally is engaged with the input side friction plate 144 (which is an input side member) and the plate member 115 in a manner that allows movement in the direction of rotation, and is engaged in a manner that allows torque to be transmitted to the friction engagement members 163 by way of the rotational direction gap 179 in the engagement portion 178. The friction engagement members 163 can also integrally rotate with the output side disk-like plate 130, and move in the axial direction. The friction engagement members 163 are also frictionally engaged with the input side friction plate 144 (which is an input side member) and the plate member 115 in a manner that allows movement in the direction of rotation. The cone spring 143 exerts an urging force not only on the friction shim 161, but also on the friction engagement members 163 against the friction plate 144 and the plate member 115. In other words, the cone spring 143 has a plurality of functions, and the number of components is therefore reduced and the structure simplified. The annular area S in FIG. 14 shows the load range of cone spring 143, and the area S includes roughly the entire area of the friction shim 161 and the radially outer portion of the friction engagement members 163.

Next, the relationship between the friction shim 161 and the friction engagement members 163 is described in greater detail. The widths in the direction of rotation (the angles in the direction of rotation) of the friction engagement members 163 are all the same, but some of the widths in the direction of rotation (the angles in the direction of rotation) of the concavities 162 may be different. That is to say, there are at least two types of friction shims 161 with differing widths in the direction of rotation of the concavities 162. In this embodiment, these are composed of two first friction shims 161A that face each other in the up and down directions of FIG. 14, and four second friction shims 161B that face each other in the left and right directions. The first friction shims 161A and the second friction shims 161B have roughly the same shape, and are preferably made of the same material. The only major point in which these differ is the width in the direction of rotation (the angles in the direction of rotation) of the rotational direction gap of the concavities 162. More specifically, the width in the direction of rotation of the concavities 162 of the second friction shims 161B is larger than the width in the direction of rotation of the concavities 162 of the first friction shims 161A. As a result, the second rotational direction gap 179B of the second engagement portion 178B in the second friction shims 161B is larger than the first rotational direction gap 179A of the first engagement portion 178A in the first friction shims 161A. In this embodiment, the former is 10° and the latter is 8°, and the difference thereof is 2°, for example.

The friction shims 161A and 161B are disposed and aligned in an alternating manner in the direction of rotation, and both edges thereof in the direction of rotation are adjacent to each other. More specifically, each second friction shim 161B has a first friction shim 161A on one rotational direction side, and a second friction shim 161B on the other. Thus, the first and second friction shims 161A and 161B are disposed to alternate between two second friction shims 161B for every first friction shim 161A. The angle between the edges in the direction of rotation is set to a value that is greater than the difference (2°, for example) between the second rotational direction gap 179B in the second friction shims 161B and the first rotational direction gap 179A in first friction shims 161A.

The operation of the frictional resistance generation mechanism 107 is described below for the case in which torsional vibration is input. In the frictional resistance generation mechanism 107, the friction shims 161 integrally rotate with the friction engagement members 163 and the output side disk-like plate 130, and also rotate in relative fashion with respect to the friction plate 144 and the plate member 115. As a result, the friction shims 161 and the friction engagement members 163 slide on the input side friction plate 144 and the plate member 115, thereby generating frictional resistance.

Next, the operation of the frictional resistance generation mechanism 107 is described for a case in which small torsional vibrations caused by combustion fluctuations in the engine are inputted to the flywheel damper.

Referring to FIG. 17, when small torsional vibration is input in the frictional resistance generation mechanism 107, the friction engagement members 163 rotate relative to the friction shim 161 in the very narrow rotational direction gap 179. In other words, the friction shims 161 are not driven by the friction engagement members 163, and the friction shims 161 therefore do not rotate in relation to the input side member. That is to say, only a hysteresis torque that is much smaller than a normal hysteresis torque can be obtained in a prescribed range of torsion angles. Thus, the vibration and noise level in the torsion characteristics can be considerably reduced because a very narrow rotational direction gap is provided in which the frictional resistance generation mechanism 7 does not operate in the prescribed angle range.

On the other hand, when small torsional vibration is input, the friction engagement members 163 slide against the friction plate 144 and the plate member 115, and small hysteresis torque is generated.

Next, the operation performed when the friction shim 161 is driven by the friction engagement members 163 is described. The operation in which the friction engagement members 163 are twisted from the neutral state shown in FIG. 16 in the rotation direction R1 of the friction shim 161 is described.

Referring to FIG. 17, when the torsion angle increases, the friction engagement members 163 in the first friction shims 161A eventually make contact with the rotational direction end face 162b on the side in the rotational direction R1 of the concavities 162 of the first friction shims 161A. At this time, the friction engagement members 163 in the second friction shims 161B have a rotational direction gap (which is half the difference between the second rotation direction gap 179B of the second friction shims 161B and the first rotational direction gap 179A of the first friction shims 161A, and is 1° in this embodiment) in the rotational direction end face 162b on the side in the rotational direction R1 of the concavities 162 of the second friction shims 161B.

When the torsion angle further increases, the friction engagement members 163 drive the first friction shims 161A and cause them to slide against the input side friction plate 144 and the plate member 115. At this time, the first friction shims 161A approach the second friction shims 161B in the rotational direction R1 because the second friction shims 161B do not move yet, but the edge portions of both of these do not make contact.

When the torsion angle finally achieves a prescribed magnitude, the friction engagement members 163 make contact with the rotational direction end face 162b of the concavities 162 of the second friction shims 161B. After this, the friction engagement members 163 drive both the first and second friction shims 161A and 161B, causing them to slide against the input side friction plate 144 and the plate member 115.

In summation, driving the friction shim 161 in relation to the input side friction plate 144 and the plate member 115 yields an area in which a constant number of plates is driven to generate an intermediate frictional resistance in the torsion characteristics before the start of the large frictional resistance area in which all of the plates are driven.

In this embodiment, the friction engagement members 163 (used as members for generating friction before frictional resistance is generated by the friction shim 161) have a function for driving the friction shim 161, as well as a function for generating hysteresis torque during small torsional vibration, so the number of components is reduced and the structure simplified.

The numbers of the first friction shims 161A and second friction shims 161B are different, and, more specifically, the number of the second friction shims 161B is greater. As a result, the frictional resistances obtained by the first friction shims 161A and the second friction shims 161B are different, and, more specifically, that of the latter is greater.

(5) Third Embodiment

Another embodiment of the frictional resistance generation mechanism is described below with reference to FIGS. 18 to 21. Description of identical portions of the above-described embodiments is omitted.

5-1) Frictional Resistance Generation Mechanism 207

Figure 18:
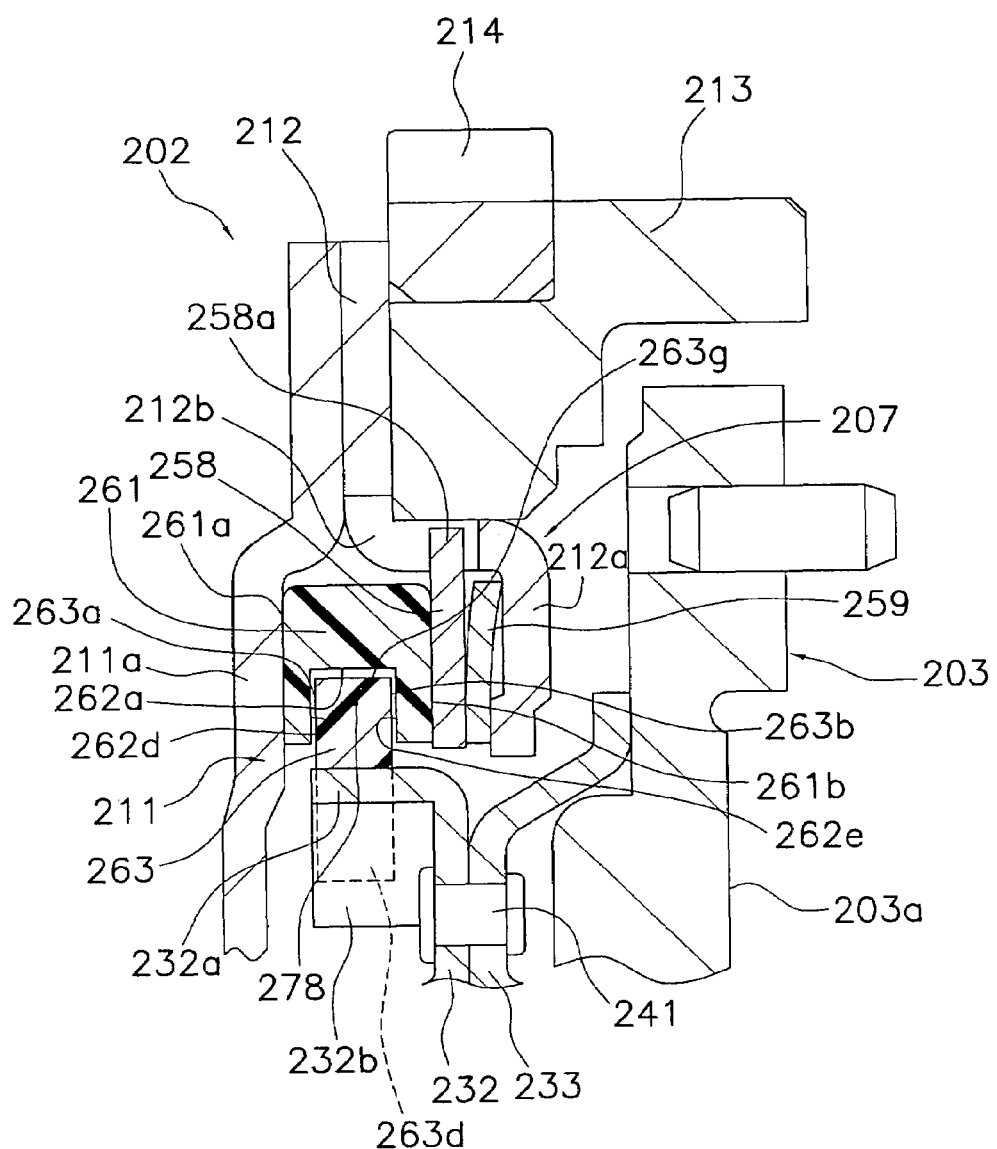
FIG. 18 is a schematic longitudinal cross-sectional view of a frictional resistance generation mechanism in accordance with a third preferred embodiment of the present invention.

As seen in FIG. 18, a frictional resistance generation mechanism 207 functions in parallel with coil springs between output side disk-like plates 232 and 233 and an input side disk-like plate 212 of a damper mechanism in the direction of rotation. Further, when a second flywheel 203 rotates relative to the crankshaft, a prescribed frictional resistance (hysteresis torque) is generated. The frictional resistance generation mechanism 207 generates a constant friction over an entire range of operating angles of the damper mechanism, and is designed to generate comparatively large frictional resistance.

The frictional resistance generation mechanism 207 is disposed in the space formed in the axial direction between the input side disk-like plate 212 and an annular portion 211a, which is a radially outer portion of a flexible plate 211. The frictional resistance generation mechanism 207 is composed of a plurality of washers in contact with each other. The washers in the frictional resistance generation mechanism 207 are disposed adjacent to the radially inner side of an inertia member 213. The frictional resistance generation mechanism 207 has, in order from the flexible plate 211 toward the opposing portion 212a of the input side disk-like plate 212, friction shims 261, an input side friction shim 258, and a cone spring 259, as shown in FIG. 18. Thus, the flexible plate 211 also has a function of accommodating the frictional resistance generation mechanism 207, so the number of components is reduced and the structure simplified.

The cone spring 259 imparts a load in the axial direction to friction surfaces, is interposed and compressed between the input side friction plate 258 and the opposing portion 212a. Therefore, the cone spring 259 urges both members in the axial direction. Pawls 258a formed on the radially outer edge of the input side friction plate 258 are engaged with cutaway areas 212b that extend in the axial direction and that are formed in the second disk-like plate 12. Thus, the input side of the friction plate 258 is prevented from rotating relative to the input side disk-like plate 212 by this engagement, but is movable in the axial direction.

Figure 19:
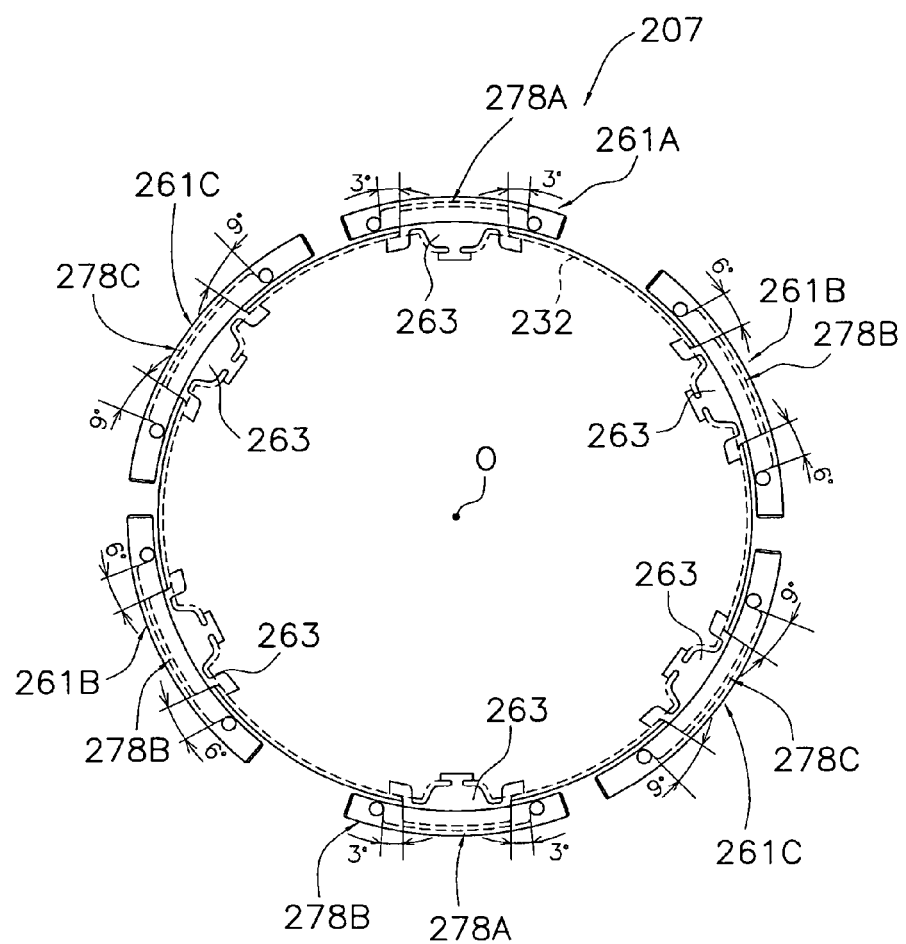
FIG. 19 is a schematic elevational view illustrating the frictional resistance generation mechanism of the third embodiment.

As shown in FIG. 19, the friction shims 261 are composed of a plurality of members that are aligned and disposed in the direction of rotation, and each of these extends in the form of an arc. In this embodiment, there are a total of six friction shims 261. As seen in FIG. 18, the friction shims 261 are interposed between the input side friction plate 258 and the annular portion 211a (which is an radially outer portion of the flexible plate 211). In other words, the axial-direction engine side surface 261a of the friction shims 261 make contact in a slidable manner with the axial-direction transmission side surface of the flexible plate 211, and the axial-direction transmission side surface 261b of the friction shims 261 makes contact in a slidable manner with the axial-direction engine side surface of the input side friction plate 258.

Figure 20:
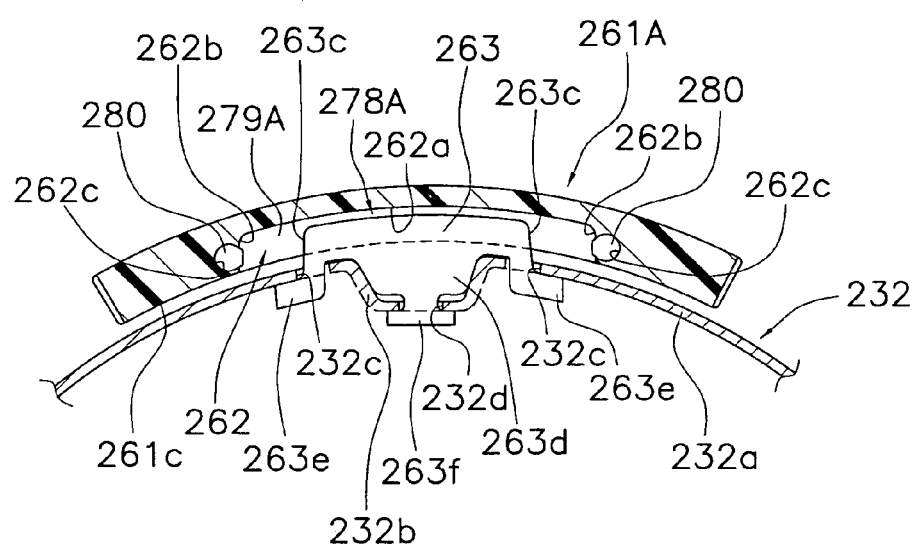
FIG. 20 is an enlarged cross-sectional view of the frictional resistance generation mechanism of the third embodiment.
Figure 21:
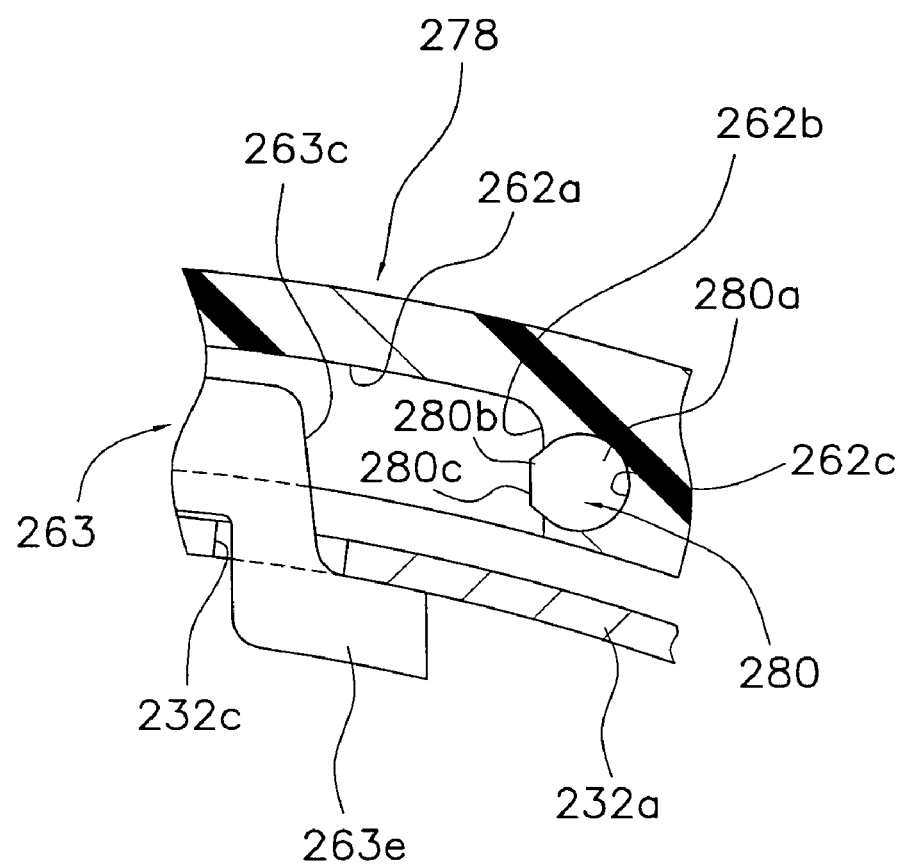
FIG. 21 is an enlarged view of a portion of FIG. 20 illustrating the frictional resistance generation mechanism of the third embodiment.

As shown in FIG. 20, concavities 262 are formed on the radially inner surface 261c of the friction shims 261. The concavities 262 are formed roughly in the center of the direction of rotation of the friction shims 261 and, more specifically, have a bottom surface 262a extending in the direction of rotation, and rotational direction end faces 262b extending from both ends thereof in a roughly radial direction (roughly at a right angle from the bottom surface 262a). As seen in FIGS. 18 and 20, the concavities 262 differ from the embodiments described above primarily in that they are closed in the axial direction. In other words, the concavities 262 are formed solely in the intermediate portion in the axial direction of the radially inner surface of the friction shims 261. Roughly disk-like concavities 262c indented on the internal side in the direction of rotation are disposed on the rotational direction end faces 262b. Cushioning members 280 are disposed in these concavities 262c, as shown in FIG. 21. The cushioning members 280 are members composed of elastic resin or rubber, for example, and are preferably composed of a thermoplastic polyester elastomer. The main body 280a of the cushioning members 280 is contained within the concavities 262c. A protruding portion 280b of the cushioning members 280 protrudes further inward in the direction of rotation from the concavity 262c, past the rotational direction end face 262b. Further, a flat surface 280c on the tip thereof is positioned further inward in the direction of rotation from the rotational direction end faces 262b.

Referring again to FIGS. 18 and 20, friction engagement members 263 are formed on the radially inner side of the friction shims 261, or, more specifically, within each of the concavities 262. The radially outer portion of the friction engagement members 263 is disposed within the concavities 262 of the friction shims 261. Both the friction shims 261 and the friction engagement members 263 are composed of resin.

The engagement portion 278, composed of the friction engagement members 263 and the concavities 262 of the friction shims 261, is described below. A radially outer surface 263g of the friction engagement member 263 is situated adjacent to the bottom surface 262a of the concavity 262. The friction engagement members 263 have rotational direction end faces 263c. The radially outer surface of the friction engagement members 263 is adjacent to the bottom surface 262a of the concavities 262, and a rotational direction gap 279 with a prescribed angle is provided between each of the end faces 263c and the rotational direction end faces 262b. The total of both angles is a prescribed angle whose size allows the friction shims 261 to rotate relative to the friction engagement members 263. This angle is preferably within a range that is equal to or slightly exceeds the damper operation angle that is created by small torsional vibrations caused by combustion fluctuations in the engine. In this embodiment, the friction engagement members 263 are disposed at the center of the direction of rotation of the concavities 262 in the neutral state shown in FIG. 19. Therefore, the size of the gap of each friction engagement member 263 in the neutral state on each side of the friction engagement member 263 in the direction of rotation is the same.

As seen in FIG. 18, the friction engagement members 263 are engaged with the output side disk-like plates 232 and 233 to rotate integrally and in a manner that allows movement in the axial direction. More specifically, an annular wall 232a extending toward the engine in the axial direction is formed on the radially outer edge of the output side disk-like plate 232, and concavities 232b indented on the internal side in the radial direction are formed corresponding to the friction engagement members 263 on the annular wall 232a. In addition, as shown in FIG. 20, slits 232c are radially formed all the way through the wall on both sides of the concavities 232b in the direction of rotation. Slits 232d are also formed in the concavities 232b.

The friction engagement members 263 have a pair of leg portions 263e that extend inward from the external side in the radial direction in each slit 232c, extend outward in the direction of rotation, and make contact with the radially inner surface of the annular wall 232a. The friction engagement members 263 have a pair of leg portions 263f that unitarily extend inward from the external side in the radial direction in each slit 232d, extend separately outward in the direction of rotation, and make contact with the radially inner surface of the annular wall 232a. As a result, the friction engagement members 263 do not move relative to the annular wall 232a to the outside in the radial direction. In addition, the friction engagement members 263 have convexities 263d that extend inward in the radial direction, and are engaged in the direction of rotation with the concavities 232b in the annular wall 232a. The friction engagement members 263 are thereby integrally rotated as convexities with the output side disk-like plate 232.

As shown in FIG. 18, the length in the axial direction of the friction engagement members 263 is less than the length in the axial direction of the concavities 262 (that is to say, the space between axial direction end faces 262d and 262e of the concavities 262 has a greater length than the space between the axial direction end faces 263a and 263b of the friction engagement members 263). Thus, the friction engagement members 263 are capable of moving in axial direction toward the friction shims 261. A gap in the radial direction is provided in the space between the radially outer surface 263g of the friction engagement members 263 and the bottom surface 262a of the concavities 262, so the friction engagement members 263 have a prescribed angle with respect to the friction shims 261, but are capable of tilting.

As described above, the friction shims 261 is engaged with the friction engagement members 263 in a manner that allows torque to be transmitted by way of the rotational direction gap 279 in the engagement portion 278. The friction engagement members 263 can also integrally rotate with the output side disk-like plate, and move in the axial direction.

Next, the relationship between the friction shims 261 and the friction engagement members 263 is described in greater detail. The widths in the direction of rotation (the angles in the direction of rotation) of the friction engagement members 263 are all the same, but some of the widths in the direction of rotation (the angles in the direction of rotation) of the concavities 262 may be different. That is to say, as shown in FIG. 19, there are at least three types of friction shims 261 with differing widths in the direction of rotation of the concavities 262. In this embodiment, these are composed of two first friction shims 261A that face each other in the up and down directions of FIG. 19, two second friction shims 261B that are disposed diagonally up and to the right and diagonally down and to the left, and two third friction shims 261C that are disposed diagonally up and to the left and diagonally down and to the right. The first to third friction shims 261A, 261B, and 261C have roughly the same shape, and are preferably made of the same material. The only major point in which these differ is the width in the direction of rotation (the angles in the direction of rotation) of the rotational direction gap of the concavities 262. More specifically, the width in the direction of rotation of the concavities 262 of the second friction shims 261B is greater than the width in the direction of rotation of the concavities 262 of the first friction shims 261A, and the width in the direction of rotation of the concavities 262 of the third friction shims 261C is greater than the width in the direction of rotation of the concavities 262 of the second friction shims 261B. As a result, the second rotational direction gap 279B of the second engagement portion 278B in the second friction shims 261B is larger than the first rotational direction gap 279A of the first engagement portion 278A in the first friction shims 261A. Similarly, the third rotational direction gap 279C of the third engagement portion 278C in the third friction shims 261C is larger than the second rotational direction gap 279B of the second engagement portion 278B in the second friction shims 261B. In this embodiment, the angle in the direction of rotation of the first rotational direction gap 279A is preferably 6°, the angle in the direction of rotation of the second rotational direction gap 279B is 12°, and the angle in the direction of rotation of the third rotational direction gap 279C is 18°.

The lengths in the direction of rotation of the first to third friction shims 261A, 261B, and 261C are each different, and these increase in size from first to third. In this embodiment, the angle in the direction of rotation of the first friction shims 261A is 40°, the angle in the direction of rotation of the second friction shims 261B is 50°, and the angle in the direction of rotation of the third friction shims 261C is 55°. Thus the surface areas of the first to third friction shims 261A, 261B, and 261C are different, and the surface area of those that operate later increases from those that operate earlier.

The operation of the frictional resistance generation mechanism 207 is described below for the case in which torsional vibrations are inputted. As seen in FIG. 18, in the frictional resistance generation mechanism 207, the friction shims 261 integrally rotate with the friction engagement members 263 and the output side disk-like plates 232 and 233, and also rotate relative to the flexible plate 211 and the input side disk-like plate 212. As a result, the friction shims 261 slide against the flexible plate 211 and the input side disk-like plate 212 to generate frictional resistance.

Next, the operation of the frictional resistance generation mechanism 207 is described for a case in which small torsional vibrations caused by combustion fluctuations in the engine are input to the flywheel damper.

Referring now to FIG. 19, when small torsional vibrations are inputted in the frictional resistance generation mechanism 207, the friction engagement members 263 rotate relative to the friction shims 261 in the very narrow rotational direction gap 279. In other words, the friction shims 261 are not driven by the friction engagement members 263, and the friction shims 261 therefore do not rotate in relation to the input side member. That is to say, only a hysteresis torque that is much smaller than normal hysteresis torque can be obtained in a prescribed range of torsion angles. Thus, the vibration and noise level in the torsion characteristics can be considerably reduced because a very narrow rotational direction gap is provided in which the frictional resistance generation mechanism 207 does not operate in the prescribed angle range.

Next, the operation performed when the friction shims 261 are driven by the friction engagement members 263 is described. The operation in which the friction engagement members 263 are twisted from the neutral state shown in FIG. 19 toward the friction shims 261 in the rotation direction R1 is described.

When the torsion angle increases, the friction engagement members 263 in the first friction shims 261A eventually make contact with the rotational direction edge surfaces 262b on the side in the rotational direction R1 of the concavities 262 of the first friction shims 261A.

When the torsion angle further increases, the friction engagement members 263 drive the first friction shims 261A, and cause them to slide against the flexible plate 211 and the input side disk-like plate 212.

When the torsion angle finally achieves a prescribed magnitude, the friction engagement members 263 make contact with the rotational direction edge surfaces 262b of the concavities 262 of the second friction shims 261B. After this, the friction engagement members 263 drive both the first and second friction shims 261A and 261B, causing them to slide in relation to the flexible plate 211 and the input side friction plate 212.

Thereafter, the corresponding friction engagement members 263 contact rotational direction edge surfaces 262c of the concavities 262 of the third friction shims 261C. After this, the friction engagement members 263 drive the first, second, and third friction shims 261A, 261B, and 261C, causing them to slide relative to the flexible plate 211 and the input side disk-like plate 212.

In summation, driving the friction shims 261 with the flexible plate 211 and the input side disk-like plate 212 yields an area in which a constant number of plates is driven to generate an intermediate frictional resistance in the torsion characteristics before the start of the high frictional resistance area in which all of the plates are driven. The effects obtained by the above-described structure and operation described above are, in principle, the same as the other embodiments.

The length in the peripheral direction (the surface area) of the first to third friction shims 261A, 261B, and 261C are different, and the surface area increases in order from first to third (in order of later operation). The magnitude of the frictional resistances can be varied by changing the length of the members in the peripheral direction in this manner. This is therefore effective against vibrations and noises.

When the rotational direction edge surface 262b of the friction shims 261 collide with the end face 263c of the friction engagement members 263, the collision is mitigated by the cushioning member 280. The knocking noise produced when the friction shims 261 collide with the friction engagement members 263 is therefore reduced and hysteresis torque builds up gradually. The cushioning member may be mounted on the side of the friction engagement members 263.

(6) Fourth Embodiment

A friction resistance generation mechanism 307 related to a fourth embodiment of the present invention is described below with reference to FIGS. 22 to 27. In this embodiment, the basic structure of the friction resistance generation mechanism 307 is the same as the friction resistance generation mechanism 207 in the above-described embodiment. A description of identical portions is omitted below, and emphasis is placed on portions that differ.

The widths in the direction of rotation (the angles in the direction of rotation) of friction engagement members 363 are all the same, but some of the widths in the direction of rotation (the angles in the direction of rotation) of the concavities 362 may be different. That is to say, there are at least three types of friction shims 361 with differing widths in the direction of rotation of the concavities 362. In this embodiment, these are composed of two first friction shims 361A that face each other in the up and down directions of FIG. 22, two second friction shims 361B that are disposed diagonally up and to the right and diagonally down and to the left, and two third friction shims 361C that are disposed diagonally up and to the left and diagonally down and to the right. The first to third friction shims 361A, 361B, and 361C have roughly the same shape, and are preferably made of the same material. The only major point in which these differ is the width in the direction of rotation (the angles in the direction of rotation) of the rotational direction gap of the concavities 362. More specifically, the width in the direction of rotation of the concavities 362 of the second friction shims 361B is greater than the width in the direction of rotation of the concavities 362 of the first friction shims 361A, and the width in the direction of rotation of the concavities 362 of the third friction shims 361C is greater than the width in the direction of rotation of the concavities 362 of the second friction shims 361B. As a result, a second rotational direction gap 379B of a second engagement portion 378B in the second friction shims 361B is larger than a first rotational direction gap 379A of a first engagement portion 378A in the first friction shims 361A, and a third rotational direction gap 379C of a third engagement portion 378C in the third friction shims 361C is larger than the second rotational direction gap 379B of the second engagement portion 378B in the second friction shims 361B. In this embodiment, the angle in the direction of rotation of the first rotational direction gap 379A is preferably 12°, the angle in the direction of rotation of the second rotational direction gap 379B is 16°, and the angle in the direction of rotation of the third rotational direction gap 379C is 18°.

The lengths in the direction of rotation (the angles in the direction of rotation) of the first to third friction shims 361A, 361B, and 361C are each different, as in the above-described embodiments.

Coil springs 390 are disposed as elastic members between each of the first to third friction shims 361A, 361B, and 361C in the direction of rotation. The coil springs 390 extend in the direction of rotation, and both edges are in contact with the rotational direction edge surface of the friction shims 361. Each coil spring 390 is compressed in the direction of rotation from the neutral state shown in FIG. 22, imparting a load to the friction shims 361 on either side in the direction of rotation.

Figure 22:
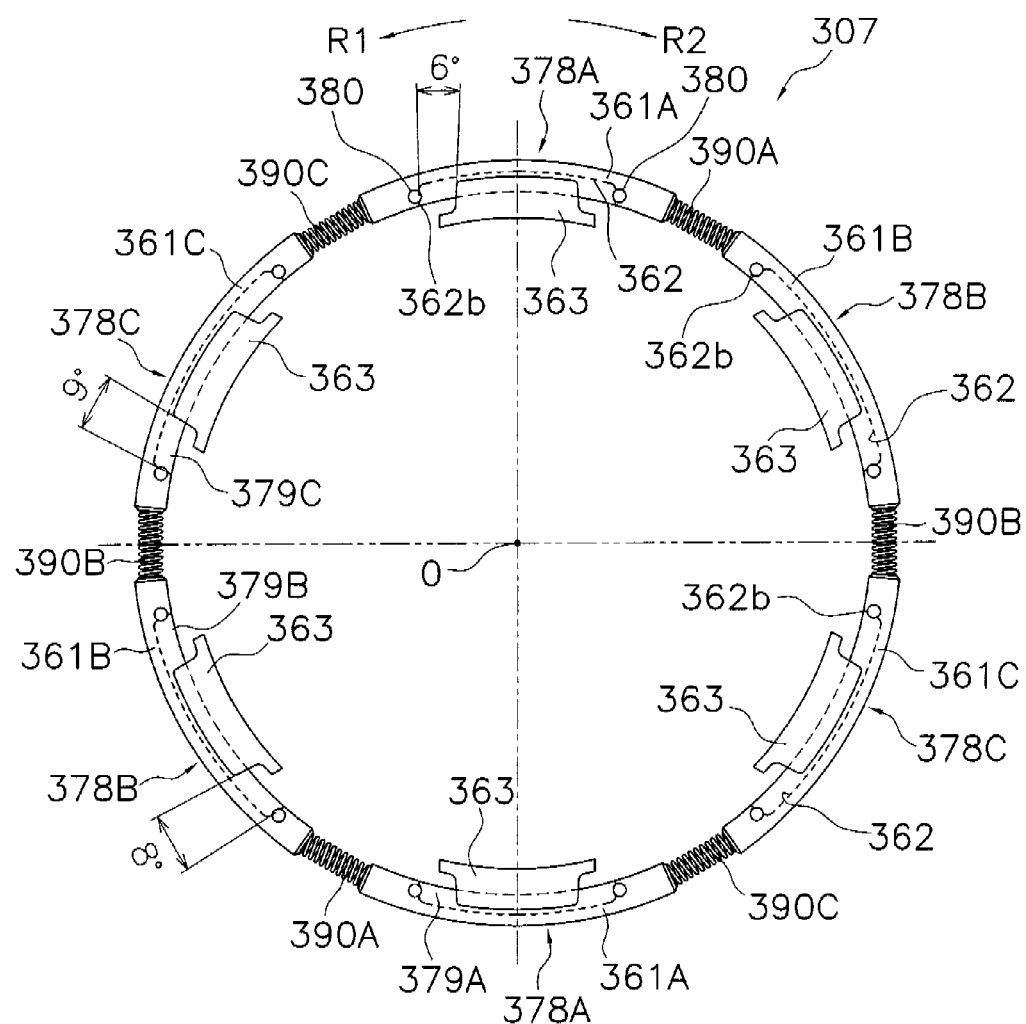
FIG. 22 is a schematic elevational view illustrating a frictional resistance generation mechanism in accordance with a fourth preferred embodiment of the present invention.

Here, the coil spring between the first friction shims 361A and the second friction shims 361B is referred to as the first coil spring 390A. Further, the coil spring between the second friction shims 361B and the third friction shims 361C is referred to as the second coil spring 390B. Moreover, the coil spring between the third friction shims 361C and the first friction shims 361A is referred to as the third coil spring 390C. However, the first to third coil springs 390A to 390C have the same shape and same spring constant, and the compressive force in the direction of rotation in the neutral state in FIG. 22 is also the same.

Next, the operation performed when the friction shims 361 are driven by the friction engagement members 363 is described. The operation in which the friction engagement members 363 are twisted from the neutral state shown in FIG. 22 toward the friction shims 361 in the rotation direction R1 is described.

When the torsion angle increases, the friction engagement members 363 in the first friction shims 361A eventually make contact with the rotational direction edge surface 362b of the concavities 362 of the first friction shims 361A in the rotational direction R1. At this time, as shown by the arrow A in FIG. 27, the hysteresis torque h1 builds up,.

Figure 23:
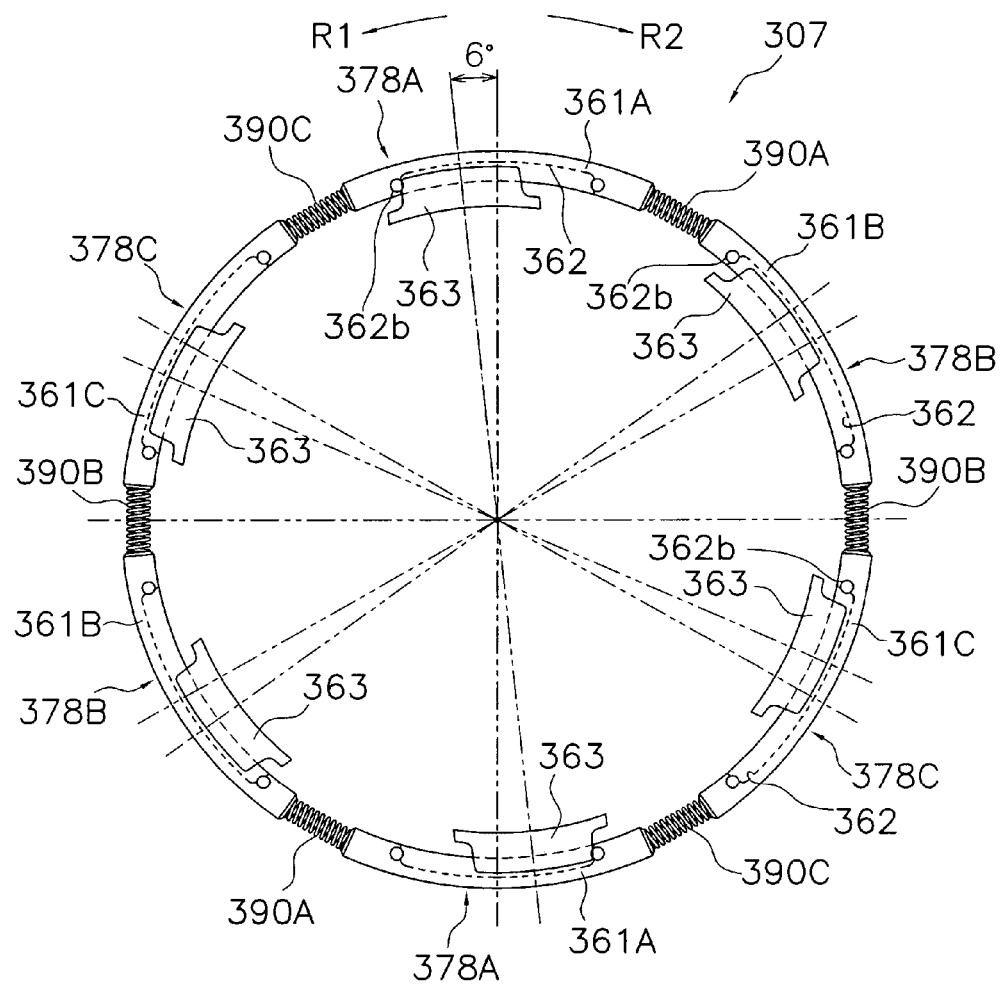
FIG. 23 is a view of a diagram illustrating the operation of the frictional resistance generation mechanism in accordance with a fourth preferred embodiment of the present invention.

Referring to FIG. 23, when the torsion angle further increases, the friction engagement members 363 drive the first friction shims 361A, and cause them to slide against a flexible plate 311 and an input side friction plate 312. During this operation, the third coil spring 390C (the coil spring in the running direction of the first friction shims 361A) is further compressed, and the first coil spring 390A (the coil spring opposite to the running direction of the first friction shims 361A) stretches itself. Therefore, hysteresis torque gradually increases during the operation from FIG. 23 to FIG. 24. The first coil spring 390A in its at most extended state is shorter than its free length. The first coil spring 390A is therefore capable of correctly maintaining its posture and position between the friction shims.

As a result of the above, the second friction shims 361B are configured so as to move with a small force in comparison with when the coil springs are not present, due to the action of the first to third coil springs 390A to 390C.

Figure 24:
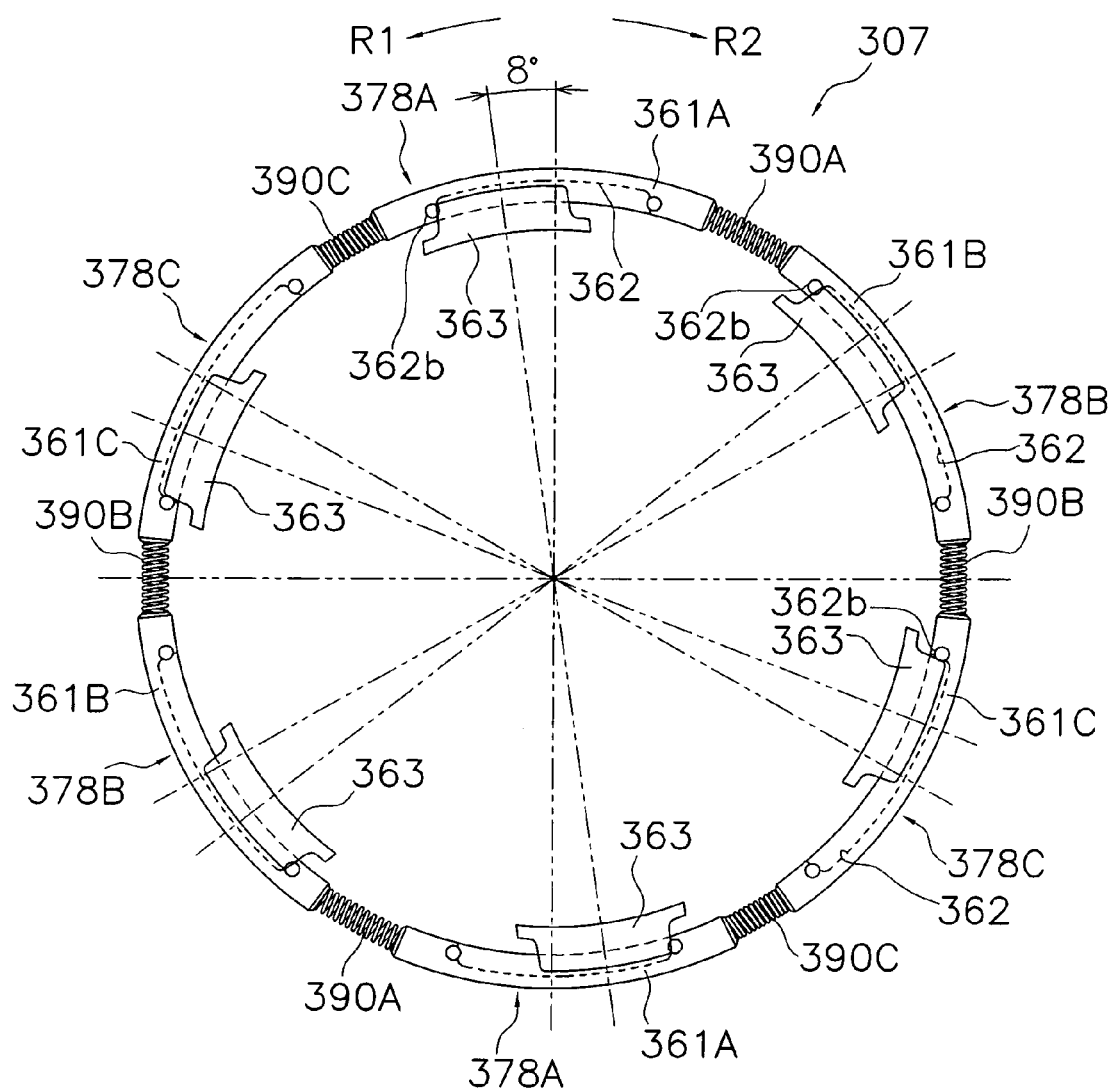
FIG. 24 is a view of a diagram further illustrating the operation of the frictional resistance generation mechanism of the fourth embodiment.

When the torsion angle finally achieves a prescribed magnitude, the friction engagement members 363 make contact with the rotational direction edge surface 362b of the concavities 362 of the second friction shims 361B, as shown in FIG. 24. At this time, the hysteresis torque h2 builds up, as shown by the arrow B in FIG. 27. After this, the friction engagement members 363 drive both the first and second friction shims 361A and 361B, causing them to slide against the flexible plate 211 and the input side friction plate 212. During this operation, the third coil spring 390C (the coil spring in the running direction of the first friction shims 361A) is further compressed, and the second coil spring 390B (the coil spring opposite to the running direction of the second friction shims 361B) stretches itself. Therefore, hysteresis torque gradually increases during the operation from FIG. 24 to FIG. 25. The second coil spring 390B in its at most extended state is shorter than its free length. The second coil spring 390B is therefore capable of correctly maintaining its posture and position between the friction shims.

As a result of the above, the third friction shims 361C are configured to move with a small force in comparison with when the coil springs are not present, due to the action of the first to third coil springs 390A to 390C.

Figure 25:
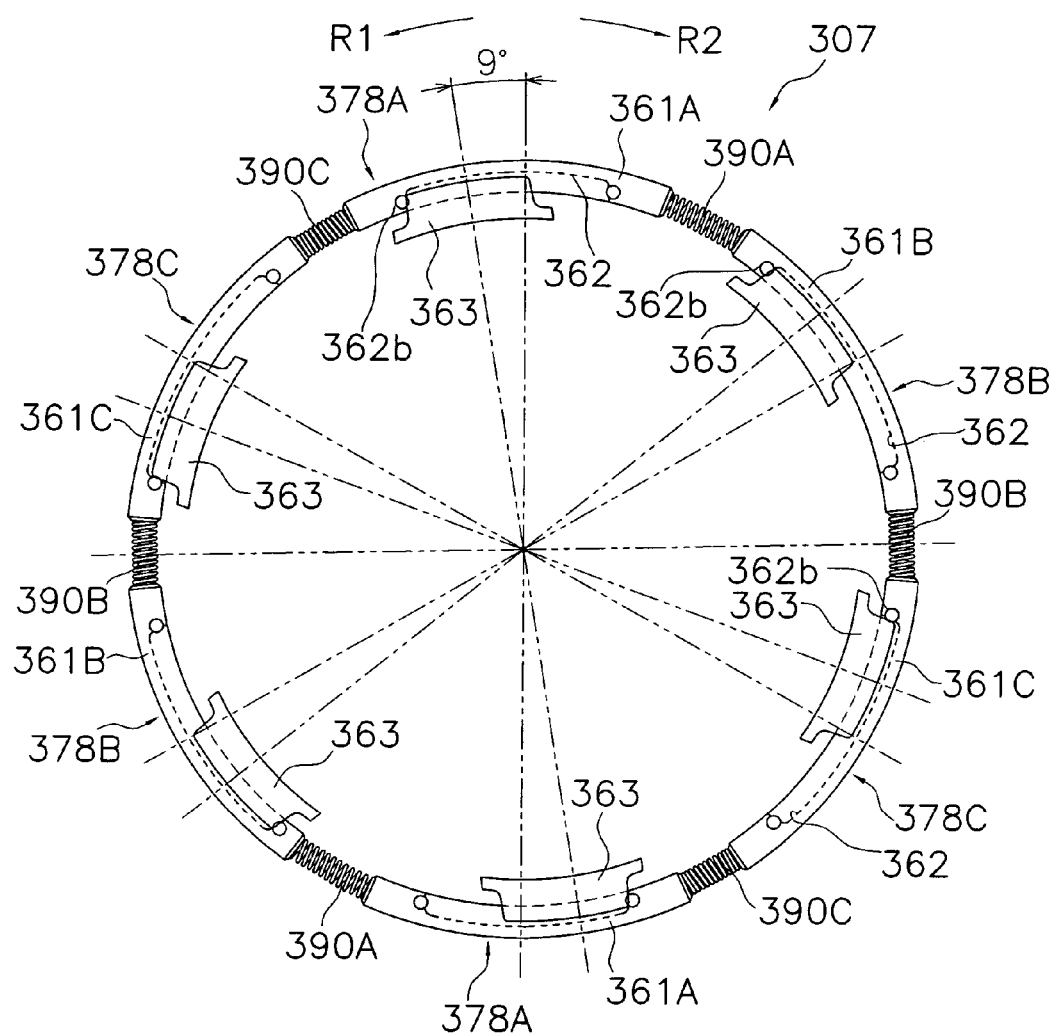
FIG. 25 is a view of a diagram even further illustrating the operation of the frictional resistance generation mechanism of the fourth embodiment.

When the torsion angle finally achieves a prescribed magnitude, the friction engagement members 363 make contact with the rotational direction edge surface 362b of the concavities 362 of the third friction shims 361C, as shown in FIG. 25. At this time, the hysteresis torque h3 builds up, as shown by the arrow C in FIG. 27. After this, the friction engagement members 363 drive all three of the first to third friction shims 361A, 361B, and 361C, causing them to slide in relation to the flexible plate 211 and the input side friction plate 212.

In summation, driving the friction shims 361 with the output side disk-like plate 232 yields an area in which a constant number of plates is driven to generate an intermediate frictional resistance in the torsion characteristics before the start of the high frictional resistance area in which all of the plates are driven. The effects obtained by the structure and operation described above are, in principle, the same as the other embodiments.

Figure 26:
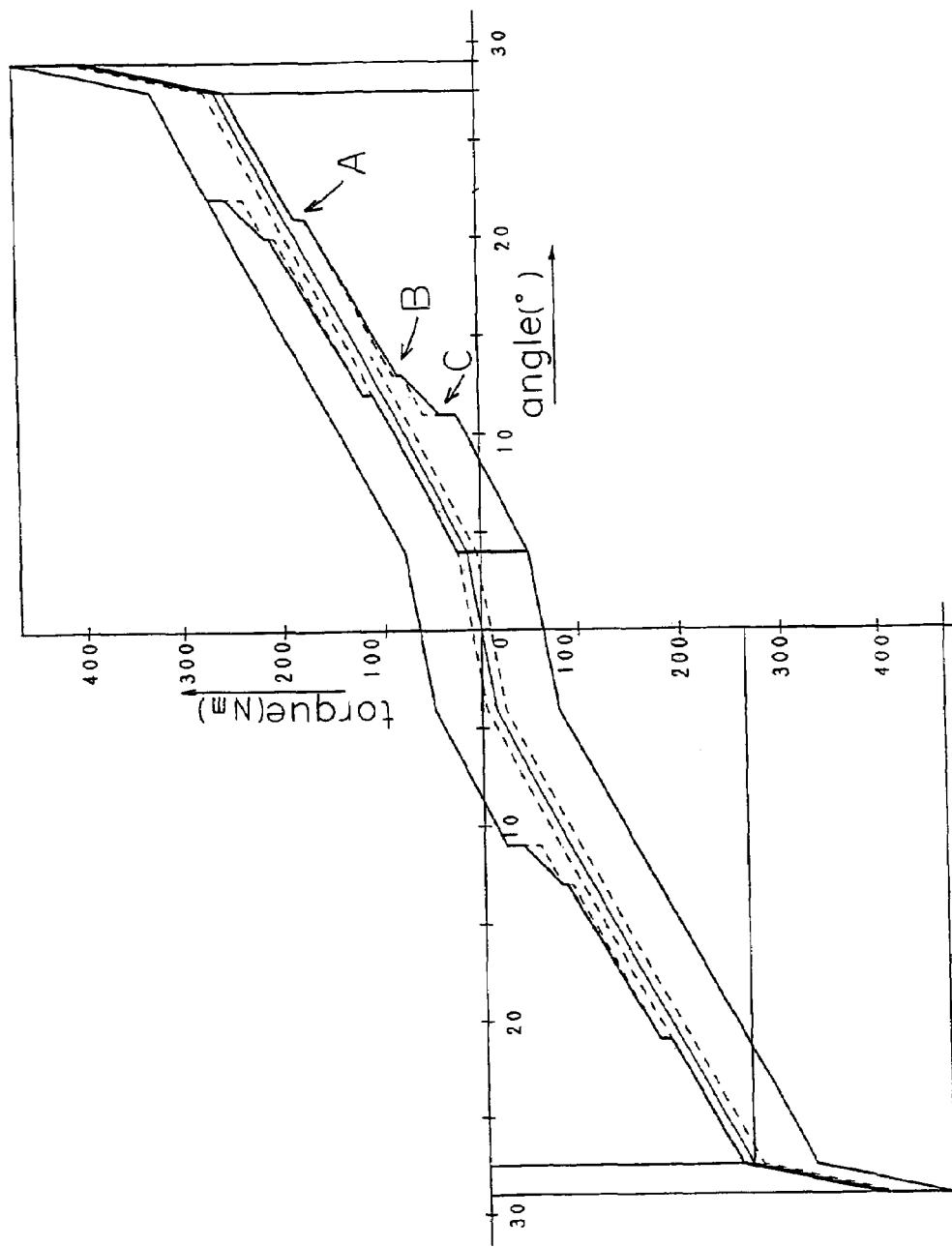
FIG. 26 is a view of a diagram of the torsional characteristics of a damper mechanism of a clutch device of the fourth embodiment.
Figure 27:
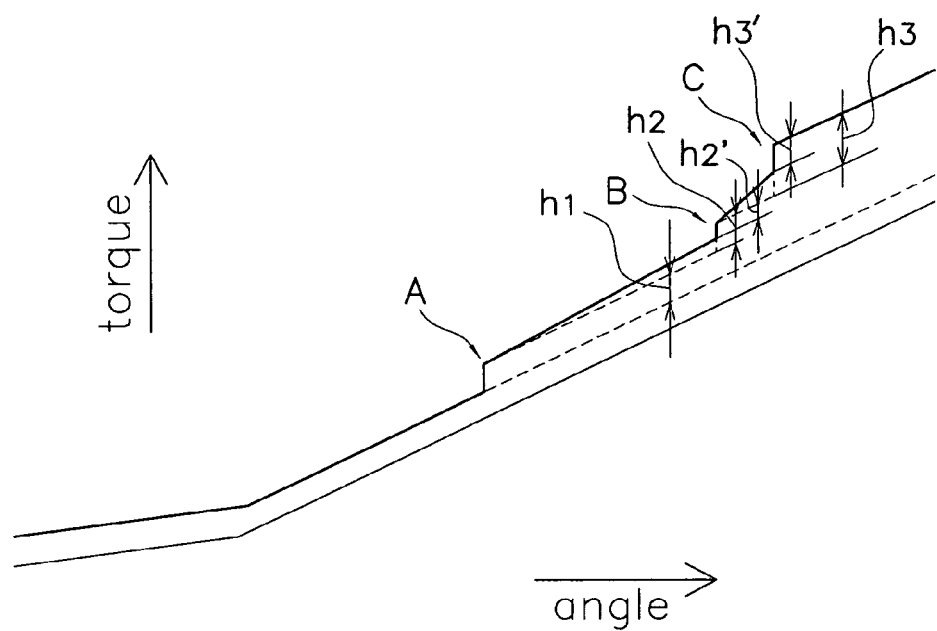
FIG. 27 is an enlarged view of a portion of FIG. 26.

A plurality of coil springs 390 is disposed in between the friction shims 361 in the rotational direction in the present invention, as shown in FIGS. 26 and 27, so the hysteresis torques gradually increase at a stage before the second and third friction shims 361B and 361C operate, and, as a result, the buildup hysteresis torques h2' and h3' that build up in the vertical direction the instant that the second and third friction shims 361B and 361C operate become respectively smaller than the hysteresis torques h2 and h3 when there are no coil springs. In other words, the knocking sound is reduced when the friction shims are acting.

The lengths in the peripheral direction (surface area) of the first to third friction shims 361A, 361B, and 361C are different, and the surface area increases in order from first to third (in order of later operation). The hysteresis torque of the friction shims is h1<h2<h3, as shown in FIGS. 26 and 27, and, in particular, the hysteresis torque h3 in the third friction shims 361C has considerably greater magnitude than the hysteresis torques h1 and h2 in the first friction shims 361A and the second friction shims 361B, and the buildup hysteresis torque h3' when the third friction shims 361A are operating is sufficiently low. The hysteresis torque h1 in the first friction shims 361A is sufficiently low, so there is no particular need to make it lower.

Referring to FIG. 22, when the rotational direction edge surface 362b of the friction shims 361 collides with the wall 363c of the friction engagement members 363, the collision is mitigated by a cushioning member 380, which are elastically deformable in the direction of rotation and configured to collide with the friction engagement members 363. The knocking noise produced when the friction shims 361 collide with the friction engagement members 363 is therefore reduced and hysteresis torque builds up gradually. Alternatively, the cushioning member may be mounted on the side of friction engagement members 363.

The elastic members disposed between the friction shims in the direction of rotation are not limited to the coil springs 390. Other springs, rubbers, or elastic resins may be disposed therein.

Also, in the above-described embodiment, the hysteresis torque was increased in three stages using three types of friction shims, but two stages are also possible, and four or more stages are also possible.

Effects of the Invention

The friction resistance generation mechanism of the present invention is configured such that only one of the frictional members slides on the second rotating member, and intermediate frictional resistance is generated before a large frictional resistance is generated overall. A barrier of high hysteresis torque is not present when a large frictional resistance is generated because the buildup of large frictional resistance is graduated in this manner. As a result, the knocking sound of the pawl decreases when a high hysteresis torque is generated in the frictional resistance generating mechanism.

The term "configured" as used herein to describe a component, section or part of a device includes hardware and/or software that is constructed and/or programmed to carry out the desired function.

Moreover, terms that are expressed as "means-plus-function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A frictional resistance generation mechanism comprising:
    a first rotating member;
    a second rotating member being rotatable relative to said first rotating member;
    a plurality of frictional members being aligned and disposed in a direction of rotation, each of said plurality of frictional members being frictionally and movably engaged with said second rotating member on a drive side and a reverse drive side in said direction of rotation, said plurality of frictional members being engaged to allow torque to be transmitted to said first rotating member via rotational direction gaps having different sizes; and
    a plurality of elastic members being disposed among said plurality of frictional members in said direction of rotation.

2. The frictional resistance generation mechanism according to claim 1, wherein
    said elastic members are disposed between each of said frictional members in a compressed state in said direction of rotation.

3. The frictional resistance generation mechanism according to claim 1, wherein said frictional members are composed of the same material.

4. The frictional resistance generation mechanism according to claim 1, wherein
    each of the plurality of elastic members is disposed between each of said plurality of frictional members in said direction of rotation to impart a load on each of said plurality of frictional members on either side in said direction of rotation.

5. The frictional resistance generation mechanism according to claim 1, wherein
    the plurality of frictional members is aligned and disposed in a direction of rotation at a radial position corresponding to a radially outer edge of said second rotating member.

6. A frictional resistance generation mechanism comprising:
    a first rotating member having convex friction engagement members;
    a second rotating member being rotatable relative to said first rotating member;
    a plurality of frictional members being aligned and disposed in a direction of rotation, said plurality of frictional members being frictionally and movably engaged with said second rotating member in said direction of rotation, said plurality of frictional members being engaged to allow torque to be transmitted to said first rotating member via rotational direction gaps having different sizes, said plurality of frictional members including first to third friction shims including concavities, said friction engagement members being arranged in said concavities, and said rotational direction gaps being arranged between said first to third friction shims and said friction engagement members; and a plurality of elastic members being disposed among said plurality of frictional members in said direction of rotation.

7. The frictional resistance generation mechanism according to claim 6, wherein said first to third friction shims are disposed parallel to said direction of rotation in the same radial position.

8. The frictional resistance generation mechanism according to claim 7, further comprising a cushioning member disposed in a portion in which at least one of said first to third friction shims collides with at least one of said friction engagement members, and
wherein said cushioning member is disposed on a rotational direction surface of at least one of said concavities.

9. The frictional resistance generation mechanism according to claim 6, further comprising a cushioning member disposed in a portion in which at least one of said first to third friction shims collides with at least one of said friction engagement members, and
wherein said cushioning member is disposed on a rotational direction surface of at least one of said concavities.

10. The frictional resistance generation mechanism according to claim 9, wherein said frictional members are composed of the same material.

11. The frictional resistance generation mechanism according to claim 6, wherein said frictional members are composed of the same material.

12. A frictional resistance generation mechanism comprising:
a first rotating member;
a second rotating member being rotatable relative to said first rotating member;
a plurality of frictional members being aligned and disposed in a direction of rotation, said plurality of frictional members being frictionally and movably engaged with said second rotating member in said direction of rotation, said plurality of frictional members being engaged to allow torque to be transmitted to said first rotating member via rotational direction gaps having different sizes; and
a plurality of elastic members disposed among said plurality of frictional members in said direction of rotation,
said first rotating member having a plurality of friction engagement members corresponding to said plurality of frictional members,
said frictional members having contacting portions colliding with said friction engagement members in said direction of rotation, and
said rotational direction gaps being arranged between said contacting portions and said friction engagement members.

13. The frictional resistance generation mechanism according to claim 12, wherein
said contacting portions include a cushioning member being elastically deformable in said direction of rotation and being configured to collide with said friction engagement portions.

14. The frictional resistance generation mechanism according to claim 13, wherein
said friction members are disposed on an radial outer side of said friction engagement members.

15. The frictional resistance generation mechanism according to claim 14, wherein
said friction members include concavities in which said friction engagement members are arranged and include said contacting portions.

16. The frictional resistance generation mechanism according to claim 15, wherein
at least two of lengths in said direction of rotation of said concavities are different.

17. The frictional resistance generation mechanism according to claim 12, wherein
said friction members are disposed on an radial outer side of said friction engagement members.

18. The frictional resistance generation mechanism according to claim 17, wherein
said friction members include concavities in which said friction engagement members are arranged and include said contacting portions.

19. The frictional resistance generation mechanism according to claim 18, wherein
at least two of lengths in said direction of rotation of said concavities are different.

20. The frictional resistance generation mechanism according to claim 12, wherein
said friction members include concavities in which said friction engagement members are arranged and include said contacting portions.

21. The frictional resistance generation mechanism according to claim 20, wherein
at least two of lengths in said direction of rotation of said concavities are different.

22. A frictional resistance generation mechanism comprising:
a first rotating member;
a second rotating member being rotatable relative to said first rotating member;
a plurality of frictional members being aligned and disposed in a direction of rotation, said plurality of frictional members being frictionally and movably engaged with said second rotating member in said direction of rotation, said plurality of frictional members being engaged to allow torque to be transmitted to said first rotating member via rotational direction gaps having different sizes, said plurality of frictional members having frictional surfaces facing an axial direction; and
a plurality of elastic members being disposed among said plurality of frictional members in said direction of rotation.

* * * * *